(12) United States Patent
Prichard

(10) Patent No.: US 11,866,016 B2
(45) Date of Patent: Jan. 9, 2024

(54) GAS-LIQUID SEPARATING GAS EXCHANGE DEVICE

(71) Applicant: Industrial Machine Service, Inc., Alexandria, TN (US)

(72) Inventor: Roy Michael Prichard, Alexandria, TN (US)

(*) Notice: Subject to any disclaimer, the term of this patent is extended or adjusted under 35 U.S.C. 154(b) by 30 days.

(21) Appl. No.: 17/471,731

(22) Filed: Sep. 10, 2021

(65) Prior Publication Data

US 2022/0073046 A1 Mar. 10, 2022

Related U.S. Application Data

(60) Provisional application No. 63/076,469, filed on Sep. 10, 2020.

(51) Int. Cl.
| | | |
|---|---|---|
| *B60T 17/00* | (2006.01) | |
| *B60T 13/38* | (2006.01) | |
| *B01D 45/02* | (2006.01) | |
| *B01D 53/26* | (2006.01) | |

(52) U.S. Cl.
CPC ............ *B60T 17/004* (2013.01); *B01D 45/02* (2013.01); *B01D 53/26* (2013.01); *B60T 13/38* (2013.01)

(58) Field of Classification Search
CPC .... B60T 17/004; B60T 17/083; B60T 17/085; B60T 17/086; B60T 13/261; B60T 13/38; B01D 69/10; B01D 45/02; B01D 45/06; B01D 53/26
USPC ....... 454/275, 339, 358, 367, 368; 55/385.3, 55/385.4; 96/4
See application file for complete search history.

(56) References Cited

U.S. PATENT DOCUMENTS

| | | | | | |
|---|---|---|---|---|---|
| 2,379,638 | A | * | 7/1945 | Hughes | ...................... F24F 7/02 |
| | | | | | 454/367 |
| 3,112,687 | A | * | 12/1963 | Henneberger | ............. B63J 2/10 |
| | | | | | 454/82 |
| 4,052,534 | A | * | 10/1977 | Devitt | ................. H01M 50/308 |
| | | | | | 429/89 |

(Continued)

FOREIGN PATENT DOCUMENTS

| | | |
|---|---|---|
| CN | 201858294 U | 6/2011 |
| CN | 202321126 U | 7/2012 |

(Continued)

*Primary Examiner* — Thomas J Williams
(74) *Attorney, Agent, or Firm* — SAFFIRE IP; Daren P. Nicholson

(57) ABSTRACT

Described herein is a gas-liquid separating gas exchange device comprising a vent mechanism that services gas exchange between the interior and exterior of a housing, a shelter of the vent mechanism distal from the housing that provides shelter of a distal area around the vent mechanism, an area-encompassing abutment rising distally from the housing and encompassing both the vent mechanism and the shelter and creating a fluid-catchment junction between the shelter and the abutment, and at least one fluid-exchange passageway in the at least one shelter allowing fluid exchange between the distal sheltered area and the abutment into the fluid-catchment junction. The gas-liquid separating gas exchange device may separate gas and liquid by gravity, energy of vibration, air-pressure forces, or a combination thereof and facilitates expulsion of contaminating liquid and debris from the housing.

20 Claims, 16 Drawing Sheets

(56) References Cited

U.S. PATENT DOCUMENTS

| | | | |
|---|---|---|---|
| 4,184,414 A * | 1/1980 | Jarnot | F24F 7/02 |
| | | | 454/275 |
| 5,072,795 A * | 12/1991 | Delgado | E21B 10/24 |
| | | | 384/93 |
| 5,522,769 A * | 6/1996 | DeGuiseppi | F21S 45/33 |
| | | | 454/270 |
| 5,937,733 A | 8/1999 | Stojic | |
| 6,029,447 A | 2/2000 | Stojic et al. | |
| RE36,955 E | 11/2000 | Pierce et al. | |
| 6,318,240 B1 | 11/2001 | Plantan et al. | |
| 6,378,414 B1 | 4/2002 | Constantinides et al. | |
| 6,389,954 B1 | 5/2002 | Constantinides et al. | |
| 6,394,462 B1 | 5/2002 | Constantinides et al. | |
| 6,626,083 B2 | 9/2003 | Bowyer | |
| 6,874,405 B2 | 4/2005 | Fisher | |
| 7,121,191 B1 | 10/2006 | Fisher | |
| 7,407,042 B2 | 8/2008 | Banks et al. | |
| 7,493,994 B2 | 2/2009 | Plantan et al. | |
| 7,743,894 B2 | 6/2010 | Scheckelhoff et al. | |
| 8,616,342 B2 | 12/2013 | Wallace et al. | |
| 8,714,318 B2 | 5/2014 | Darner et al. | |
| 8,851,243 B2 | 10/2014 | Prescott et al. | |
| 8,978,839 B2 | 3/2015 | Bradford et al. | |
| 9,004,236 B2 | 4/2015 | Plantan et al. | |
| 9,120,059 B2 * | 9/2015 | Daimon | H05K 5/0213 |
| 9,132,820 B2 | 9/2015 | Plantan et al. | |
| 9,193,344 B2 | 11/2015 | Shimomura et al. | |
| 9,440,631 B2 | 9/2016 | Wallace et al. | |
| 9,440,633 B2 | 9/2016 | Switzer et al. | |
| 9,586,567 B2 | 3/2017 | Derouault et al. | |
| 9,688,261 B2 | 6/2017 | Bradford et al. | |
| 9,701,297 B2 | 7/2017 | Fisher et al. | |
| 9,765,835 B2 | 9/2017 | Plantan et al. | |
| 9,855,940 B2 | 1/2018 | Wallace et al. | |
| 9,903,426 B1 | 2/2018 | Darner et al. | |
| 9,988,033 B2 | 6/2018 | Spath | |
| 10,065,621 B2 | 9/2018 | Arkan et al. | |
| 10,391,997 B2 | 8/2019 | Bradford et al. | |
| 10,428,885 B2 | 10/2019 | Liu et al. | |
| 10,493,972 B2 | 12/2019 | Fisher et al. | |
| 2011/0275305 A1 * | 11/2011 | Egersdoerfer | F21V 31/03 |
| | | | 454/339 |
| 2013/0032437 A1 | 2/2013 | Akin et al. | |
| 2019/0135253 A1 | 5/2019 | Oster et al. | |
| 2019/0176793 A1 | 6/2019 | Koelzer et al. | |
| 2022/0063580 A1 * | 3/2022 | Roberts | F16D 65/28 |
| 2022/0073046 A1 * | 3/2022 | Prichard | B60T 17/08 |

FOREIGN PATENT DOCUMENTS

| | | | | |
|---|---|---|---|---|
| CN | 103503587 A * | 1/2014 | | B01D 69/10 |
| CN | 205479043 U | 8/2016 | | |
| CN | 106080559 A | 11/2016 | | |
| CN | 205836797 U | 12/2016 | | |
| EP | 1064118 A1 * | 1/2001 | | B21C 23/001 |
| EP | 2424757 B1 | 8/2016 | | |
| EP | 3038871 B1 | 10/2017 | | |

\* cited by examiner

GAS-LIQUID SEPARATING GAS EXCHANGE DEVICE

FIELD OF THE INVENTION

The present invention relates to gas-liquid separating gas exchange devices including, for example, air-water separating air exchange devices for brake systems including brake actuator systems.

BACKGROUND OF THE INVENTION

Spring air brake actuators are commonly used in heavy-duty transportation including in trains, train cars, trucks, and trailers. Generally, the art considers two types of spring air brake actuators, emergency brake actuators and service brake actuators. These actuators may be constructed separately but are often combined into a single dual assembly. An emergency or parking brake actuator often employs air pressure to keep the brake disengaged while a vehicle is in motion. In a common approach, when air pressure is removed, the brake automatically engages via spring compression. This occurs appropriately when the vehicle is turned off or if there is a failure in the vehicle air system.

A common service brake actuator comprises a closed housing containing a diaphragm stretched across the inside. A slidable push rod extends out of the housing for attachment to the brakes of the vehicle and moves one side of the diaphragm. The other side of the diaphragm forms a sealed service brake chamber. The service brake chamber has an opening that connects pressurized air, generally from a compressor. Braking is applied by introduction of sufficient pressure into the sealed service chamber to move the diaphragm thereby moving the push rod outward from the housing. A light return spring is generally positioned inside the service brake housing around the push rod to urge retraction when air pressure behind the diaphragm is reduced.

A common emergency brake actuator may be incorporated with the service brake assembly. The emergency brake generally reflects a distinct housing comprising another diaphragm creating another sealed chamber along with a strong compression spring. The emergency brake diaphragm is often likewise connected in some manner with the service brake push rod. This other sealed chamber is formed on one side of the diaphragm in the emergency brake housing while the main compression spring is installed on the opposite side of the diaphragm. The sealed emergency brake chamber is also connected to an air compressor. While sufficient caging air pressure is provided to the sealed chamber, the diaphragm remains fully expanded and the main spring is compressed, often referred to as caged. When air pressure is intentionally reduced or a leak forms in the sealed chamber, pressure on the diaphragm is insufficient to keep the main spring compressed and the main spring advances the pushrod outwardly applying the brake.

As a result, when a vehicle is parked, air pressure to the emergency brake is reduced and the main spring compression relaxes, applying the brakes. When the emergency brake is applied or disengaged, respectively, air pressure is introduced or removed from the lower sealed chamber in the emergency brake housing, causing the diaphragm inside the housing to move back and forth. In order for the diaphragm to expand and compress the main spring, air in the upper emergency brake housing chamber around the spring must be allowed to escape to the outside or otherwise be redistributed through the brake actuator housing. When the diaphragm is contracted to release the main spring, air enters the upper housing around the main spring as the volume of the chamber increases. In common application, a plurality of air holes is provided in the upper housing around the main spring to allow air to enter and exit as the diaphragm advances or retracts. This air exchange between the chamber of the upper housing and the outside atmosphere consistently draws moisture, dust, ice, brine, salt, water, oil, dirt, concrete particles, asphalt particles, further debris, and other unwanted corrosive, abrasive, and friction-causing materials into the emergency brake housing from the outside through the air holes. Additionally, undercarriage pressure washing with corrosive and caustic detergents and other cleaners results in introduction of contaminants to the brake actuator. Early corrosion and failure of the main spring results from the presence of these materials. Additionally, corrosion, debris, and abrasive materials impact movement of the braking pushrods generating braking difficulties and often requiring early replacement of the actuator.

It is common in the art for a main compression spring to be provided with a thick paint coating to mitigate rust and other corrosion. Debris such as dirt, salt, and other abrasive materials act to erode away the coating resulting in spring corrosion and premature failure. Additionally, salt from roads mixed with water is a naturally more corrosive solution, and when allowed into the chamber to interact with the spring will cause it to degrade more quickly, especially once any coating has been worn away. Salt water is an electrolyte solution which allows electrons to move more easily, thereby increasing the rate of spring corrosion including the rate of the rusting process. In addition, salt water is understood to comprise greater total dissolved solids (TDS) than normal water, which causes salt water to be even more abrasive.

Some inadequate and often dangerous solutions have been advanced in the art in response to the problem of early main spring failure from moisture, salt, and abrasive corrosion and related pushrod movement friction and failure.

U.S. Pat. No. 4,508,018 describes a sealed internal breathing system with a tube between the service brake housing and the emergency brake housing to allow air pressure to exchange among the brake chambers of the housing. Outside air is not available to equilibrate air pressures within the housings. Failure of the breathing tube may result in the creation of unwanted and unexpected positive or negative pressure in one or the other of the otherwise sealed chambers. This can result in spectacular and dangerous failure of the braking system during over-the-road operation. Additionally, use of the described tube requires specially designed housings for both the spring brake and emergency brake actuators resulting in difficult, costly, and failure-prone manufacture and repair.

U.S. Pat. No. 10,065,621 illustrates an internally-vented spring brake actuator with a release bolt plug having a pressure release lip disclosed solely to allow the release of pressure from the spring housing to the atmosphere. The disclosure otherwise relies entirely on internal venting, which does not solve the problem of hazardous negative or positive pressure creation within the actuator resulting in dangerous failure.

U.S. Pat. No. 6,378,414 illustrates a removable filter cap for attachment to a caging tool opening in the upper housing of an emergency brake actuator. The cap includes a plurality of ventilation holes and a membrane of oleophobic and hydrophobic material that allows air to pass into and out of the emergency brake housing, while keeping debris out. No mechanism is provided by which contaminants within the housing may escape or be expelled from the housing by air pressure or vibrational forces. The illustration relies entirely upon the filtering mechanism for keeping foreign material out and provides no mechanical method of separating air from water as moisture laden air moves into the housing. The filter is dangerously subject to clogging and creation of possibly-catastrophic negative or positive pressure in the brake actuator housing.

U.S. Pat. No. 10,428,885 illustrates a waterproof railway vehicle brake cylinder dust cover having a fixed filter felt pad with a downwardly-extending skirt. The disclosed dust cover with fixed filter felt pad provides some protection against water and debris but must be installed on the underside of the cylinder housing such that when rain water flows down along the brake cylinder dust cover, rain water will fall down along the skirt. As a result, the disclosed skirt is markedly higher than the disclosed filter element such that water flows down the skirt and not into the filter but the high skirt continues to entrap dust and other small and microscopic particles. The disclosed filter additionally does not allow contaminants that have entered the chamber through other means to exit. As a result, the disclosed technology effectively traps contaminants inside the cylinder housing. The fact that the disclosed filter stops the flow of water and other inadvertently-collected contaminants from flushing out of the brake cylinder housing creates significant technical problems. In addition, the disclosed filter requires regular cleaning and debriding to avoid clogging, which adds extra steps to maintenance requirements while maintenance further requires technicians trained in identifying clogged and/or clogging filters. Installation of the disclosed dust cover further requires removal of the chamber from the brake component since the cover is attached to the housing via pins. The dust cover, therefore, leaves the art with significant drawbacks including inability of the cylinder housing to flush water and contaminants from the housing through the filtered opening, filter monitoring, maintenance and replacement requirements, dangerous risk of filter clogging and vacuum creation, required underside positioning of the filter, absence of reversible plug technology, and requirements for a relatively tall skirt system that counter-productively results in the trapping of dust and debris. As a result, the disclosure relies extensively upon a fallible filtering mechanism to separate air and water where the filtering mechanism is subject to clogging and makes flushing of internal contaminants through the filter impossible while not sufficiently mitigating the creation of dangerous negative or positive pressure in the brake cylinder with possible catastrophic results.

U.S. Pat. No. 5,320,026 describes a dust guard in the upper emergency brake housing between the main spring and the housing wall to prevent debris and abrasive materials from impacting motion of the pushrod. The disclosure does not prevent water, moisture, and debris from entering the upper chamber through the air openings and does not solve the problem of corrosion and abrasion of the main spring.

U.S. Pat. Nos. 5,372,059 and 5,722,311 use valving to limit air entry around the main spring only from the sealed chamber in the spring brake housing while air may otherwise escape to the outside from the spring brake housing. Likewise, U.S. Pat. No. 5,873,297 describes valving for air exchange between the sealed chamber and the area around the main spring. None of these systems avoid the dangerous possibility of excess negative or positive pressure in the sealed chambers and all have cumbersome valving systems that are difficult to manufacture and vulnerable to a number of kinds of failures that are dangerous, costly, and present difficulties in repair.

U.S. Pat. No. 5,836,233 illustrates breather holes located on side walls of the upper housing of the spring break actuator. When the main spring is compressed or caged, a diaphragm covers the holes. When the main spring is not caged, the breather holes expose the housing to atmospheric moisture and debris and resulting corrosion, abrasion, and early failure. In addition, a cap with a check valve is described as attached to the upper housing.

U.S. Pat. No. 9,586,567 illustrates a diaphragm valve for a spring brake cylinder wherein the diaphragm valve is illustrated to have a movable outlet diaphragm and a movable inlet diaphragm. In function, the chamber is expected to be otherwise sealed—to avoid air movement bypassing the diaphragm valve. The valve provides no air-water separating function and, as such, does not limit the introduction of moisture and corrosive and abrasive dissolved salt and small debris into the spring housing and does not solve the problem of corrosion and early failure of the make spring. In addition, the diaphragm valve system is subject to tearing and clogging. Failure of the diaphragm may cause a vacuum to be formed in the parking brake chamber, due to the expectation that diaphragm valve is the only method by which the chamber can breathe and transfer air. Diaphragm failure may result in catastrophic parking/emergency side brake failure.

In view of these unsatisfactory and sometimes dangerous approaches to the need for pressure equilibration in emergency brake actuator housing while attempting to avoid corrosion and debris abrasion of the main spring and pushrod, there is a continuing need for ventilation means that mechanically separate air from water while sustaining air exchange between internal and external housing environments and providing a mechanism for escape or expulsion of moisture, debris, and dissolved solids internal to a housing. This need is likewise seen in transportation, petroleum management, chemical storage and other industries requiring gas/liquid separation at a point requiring gas exchange. For example, the need is present in hydronic applications, including those systems requiring an air-water and gas-liquid separation that allows for air and other gasses to be bled from a system while separating gas from liquid. Compressed air systems also must have a drain-water catch that can be opened to release water from the system. Analogously, machine and repair shops use pneumatic tools in the form of impact drivers, grinders, cutters, and various other tools, including air paint sprayers that must be contaminate free or otherwise risk mixing contaminants into the paint. As a result, machine shops, repair shops, and paint shops generally require water to be bled from various pneumatic systems to prevent damage to tools as well as to prevent water from contaminating any mixture that the compressed air is being blown into. Natural gas and propane flame systems likewise require drip legs installed prior to the connection to the appliance to prevent water from interfering with the combustion process. Similarly, fire engines employ air bleeders on intakes and outputs from required water pumps to prevent erratic movement on hose lines as well as to prevent air from entering the pump and causing cavitation, which may damage the pump.

A gas-liquid separating gas exchange device that avoids these technical difficulties in the current art is needed. In response to these continuing needs and despite extensive efforts in the art to solve these technical problems, the applicant has now surprisingly provided a gas-liquid separating gas exchange device that employs gravitational, vibrational, and gas-exchange forces for separation of gas and liquid at a point of necessary gas exchange between an internal and an external environment that is subject to pressure differences.

SUMMARY OF THE INVENTION

The present invention provides a gas-liquid separating gas exchange device as well as a housing comprising the gas-liquid separating gas exchange device, an air brake actuator housing comprising an air-water separating air exchange device, a method of manufacture of a gas-liquid separating gas exchange device, and a method of gas-liquid separation and gas exchange.

A first non-limiting aspect of the present disclosure provides a gas-liquid separating gas exchange device comprising (1) at least one vent mechanism comprising at least one through-hole that services gas exchange in and out of at least one housing, (2) at least one shelter of the vent mechanism distal from the housing that provides at least one sheltered area distal to the vent mechanism, (3) at least one area-enclosing abutment rising distally from the housing and at least partially enclosing at least the at least one shelter and the distal portion of the at least one vent mechanism, and (4) at least one fluid-exchange passageway within the at least one shelter of the vent mechanism allowing fluid exchange between the at least one sheltered area and the at least one abutment, wherein fluid may exit the at least one sheltered area via movement through the at least one fluid-exchange passageway and may exit the device by moving over the at least one abutment and wherein gas may exchange between the interior of the housing and the exterior of the housing through the at least one through-hole of the at least one vent mechanism and through the at least one fluid-exchange passageway.

In a non-limiting embodiment, the device further comprises at least one base member comprising at least one base-member through-opening integrated with the at least one vent mechanism to allow gas exchange between the interior of the housing and the exterior of the housing through the at least one through-hole of the at least one vent mechanism.

In a non-limiting embodiment, the at least one base member further comprises at least one attachment mechanism for attachment of the device to at least one opening in said housing.

In a further non-limiting embodiment, the at least one vent mechanism comprises a plurality of breathing apertures distal to the housing and axial to the at least one vent through-hole allowing gas to exchange from the interior of the housing into the at least one sheltered area. In a further non-limiting embodiment, the plurality of breathing apertures distal to the housing and axial to the at least one vent through-hole exit the vent mechanism immediately proximal to the shelter. Non-limitingly, the plurality of breathing apertures may be four breathing apertures.

In a non-limiting embodiment, the at least one shelter of the vent mechanism distal from the housing comprises axial sidewalls at least partially in contact or integrated with the base member and rising distally from the housing and comprises at least one distal cover in contact or integrated with the sidewalls. In a further non-limiting embodiment, the at least one shelter is annular with sidewalls distally tapering conically to the distal cover wherein the distal cover is likewise annular.

In a non-limiting embodiment, the at least one area-enclosing abutment is axial to the vent mechanism and encompasses at least the distal end of the vent mechanism and the shelter of the vent mechanism. In a further non-limiting embodiment, the at least one area-enclosing abutment is annular and axial to the distal end of the vent mechanism and rises distally from the housing.

In a non-limiting embodiment, the at least one area-enclosing abutment comprises a juncture with the at least one shelter of the vent mechanism to provide a fluid-catchment junction between the at least one area-enclosing abutment and the at least one shelter.

In another non-limiting embodiment, the at least one shelter of the vent mechanism distal from the housing comprises axial sidewalls at least partially in contact or integrated with the base member and rising distally from the housing and comprises at least a distal cover in contact or integrated with the sidewalls and the at least one area-enclosing abutment is annular and axial to the distal end of the vent mechanism rising distally from the housing and wherein the fluid-catchment junction is provided at an integrated juncture among the at least one shelter, the at least one area-enclosing abutment, and the at least one base member.

In a non-limiting embodiment, the at least one fluid-exchange passageway provides fluid exchange between the at least one sheltered area and at least one fluid-catchment junction. In a further non-limiting embodiment, the at least one fluid-exchange passageway is four fluid exchange passageways.

In a non-limiting embodiment, the device is oriented at an angle to perpendicular to the force of gravity such that (1) liquid present in the fluid-catchment junction may migrate over the at least one abutment and out of the device as liquid rises within the fluid-catchment junction to a point at which it may overflow the distal portion of the at least one abutment, (2) liquid present in the fluid-catchment junction may be shaken over the abutment and out of the device as vibrational forces or air-pressure forces or a combination of both are applied to the device, or (3) liquid present in the fluid-catchment junction may proceed over the at least one abutment and out of the device through a combination of gravitational, vibrational, and air-pressure forces.

In a non-limiting embodiment, the at least one vent mechanism comprises a plurality of breathing apertures distal to the housing and axial to the at least one vent through-hole allowing gas to exchange from the interior of the housing into the at least one sheltered area and wherein the device is oriented at a sufficient angle to the force of gravity in combination with any of the vibrational forces such that substantial liquid does not enter any one of the plurality of breathing apertures at the distal end of the at least one vent mechanism and overflow through the at least one vent through-hole into the housing before exiting the device over the at least one abutment by the force of gravity in combination with any of said vibrational or air-pressure forces.

In a non-limiting embodiment, the gas-liquid separating gas exchange device is an air-water separating air exchange device and the housing is an air brake actuator housing.

In a non-limiting embodiment, the base member is constructed in an integral manner from a resilient elastomeric material and comprises a retention portion which can be assembled in a positive-locking manner with resilient deformation in an associated through-opening in the at least one housing. In a further non-limiting embodiment, the base member further comprises an extension arm extending outward from the retention portion of the base member where the extension arm comprises a resilient deformable annular and tubular stem further comprising an attachment mechanism for insertion in a corresponding stem attachment receiving hole in the housing.

In a non-limiting embodiment, the base member comprises an attachment mechanism comprising a threaded member capable of screwing the gas-liquid separating gas exchange device into a corresponding receiving hole in a housing. In a non-limiting embodiment, the receiving hole is a caging tool hole.

A second non-limiting aspect of the present disclosure provides a spring air brake actuator system for heavy duty vehicles, wherein the actuator system comprises external venting of the emergency brake housing, comprising: an actuator housing, a service diaphragm, a service pushrod, a service spring, a parking diaphragm, a parking push-rod, a parking spring, a caging tool opening, and a plug for the caging tool opening that separates air from water while allowing air to exchange between the interior and exterior of the actuator housing, wherein the plug comprises (1) at least one vent mechanism that services gas exchange for the actuator housing, (2) at least one shelter of the vent mechanism distal from the actuator housing that provides at least one sheltered area distal to the vent mechanism, (3) at least one area-enclosing abutment rising distally from the actuator housing and at least partially enclosing at least the at least one shelter and at least the distal portion of the at least one vent mechanism, (4) at least one fluid-exchange passageway within the at least one shelter allowing fluid exchange between the at least one sheltered area and the at least one abutment, and (5) at least one base member comprising at least one base-member through-opening integrated with the at least one vent mechanism to allow gas exchange between the interior of the housing and the exterior of the housing through the at least one vent mechanism and comprising at least one attachment mechanism for attachment of the device to at least one opening in the at least one housing.

In a non-limiting embodiment, the at least one vent mechanism further comprises at least one flexible two-way venting valve. In a further non-limiting embodiment, the at least one flexible two-way venting valve is a flexible slit two-way venting valve positioned in the vent through-hole of the at least one vent mechanism distal to the housing.

A third non-limiting aspect of the present disclosure provides, a gas-liquid separating gas exchange device comprising (1) at least one ventilation means for providing gas exchange for at least one housing, (2) at least one sheltering means for providing shelter of the at least one ventilation means, (3) at least one area-encompassing means rising distally from the housing and axially encompassing at least the at least one sheltering means and at least the distal end of the at least one ventilation means, and (4) at least one fluid-exchange means allowing fluid exchange between the at least one sheltering means and the at least one area-enclosing means.

A fourth non-limiting aspect of the present disclosure provides, an air-water separating air exchange device comprising:
(1) at least one vent mechanism that services air exchange in and out of at least one brake actuator housing, wherein the at least one vent mechanism comprises a plurality of breathing apertures distal to the housing and axial to a vent through-hole allowing gas to exchange from the interior of the housing into at least one sheltered area and wherein the breathing apertures exit the vent mechanism immediately proximal to a distal shelter covering,
(2) at least one shelter of the vent mechanism distal from the housing that provides at least one sheltered area distal to the vent mechanism, wherein the at least one shelter of the vent mechanism distal from the housing comprises axial sidewalls at least partially in contact or integrated with a base member and rising distally from the housing and comprises at least a distal cover in contact or integrated with the sidewalls and said at least one shelter is annular with sidewalls distally tapering in a conical and narrowing direction to the distal cover where the distal cover is likewise annular and wherein said distal cover provides said distal shelter covering proximal to which said breathing apertures exit the vent mechanism,
(3) at least one area-enclosing abutment rising distally from the housing enclosing at least the at least one shelter and at least the distal portion of the at least one vent mechanism, wherein the at least one area-enclosing abutment is axial to the vent mechanism and encompasses at least the distal end of the vent mechanism and the shelter of the vent mechanism and wherein the at least one area-enclosing abutment is annular and axial to the distal end of the vent mechanism rising distally from the housing and wherein the at least one area-enclosing abutment comprises a juncture with the at least one shelter of the vent mechanism to provide a fluid-catchment junction between the at least one area-enclosing abutment and the at least one shelter and wherein the fluid-catchment junction is provided at an integrated juncture among the at least one shelter, the at least one area-enclosing abutment, and the at least one base member,
(4) a plurality of fluid-exchange passageways within the at least one shelter of the vent mechanism allowing fluid exchange between the at least one sheltered area and the at least one abutment, wherein fluid may exit the at least one sheltered area via movement through one or more of the plurality of fluid-exchange passageways and may exit the device by moving over the at least one abutment and air may exchange between the interior of the housing and the exterior of the housing through the at least one vent mechanism and through the plurality of fluid-exchange passageways and wherein one or more of the plurality of fluid-exchange passageways provides fluid exchange between the at least one sheltered area and the at least one fluid-catchment junction, and
(5) at least one base member comprising at least one base-member through-opening integrated with the at least one vent mechanism to allow air exchange between the interior of the housing and the exterior of the housing through the at least one vent mechanism wherein the at least one base member comprises at least one attachment mechanism for attachment of the device to at least one associated through-opening in said housing wherein the base member is constructed in an integral manner from a resilient elastomeric material and comprises a retention portion which can be assembled in a positive-locking manner with resilient deformation to the corresponding through-opening in the at least one housing and further comprises an extension arm extending outward from the retention portion of the base member and comprising a resilient deformable annular and tubular stem further comprising an attachment mechanism for insertion in a corresponding stem attachment receiving hole in the housing.

In a non-limiting embodiment, the at least one vent mechanism further comprises at least one flexible two-way venting valve. In a non-limiting embodiment, the at least one flexible two-way venting valve is a flexible slit two-way venting valve positioned within the through-hole of the at least one vent mechanism distal to the housing.

In a non-limiting embodiment, the device is oriented at a sufficient angle to the force of gravity in combination with any present vibrational and air-pressure forces such that liquid is substantially deterred from entering any one of the plurality of breathing apertures at the distal end of the at least one vent mechanism and substantially deterred from overflowing through the vent mechanism through-hole into the housing before exiting the device over the at least one abutment by the force of gravity in combination with the any vibrational or air-pressure forces.

In a non-limiting embodiment, the device may comprise self-cleaning interior surfaces providing expulsion of liquid, debris, and solutes from the device and the at least one brake housing upon application of vibrational forces, expelling air-pressure forces, or a combination thereof. In a non-limiting embodiment, the self-cleaning interior surfaces have a roughness of less than about 1.6 µm. In a further non-limiting embodiment, the at least one area-enclosing abutment has a modulus of elasticity of about 3.14 to 3.92 GPa. In a further non-limiting embodiment, the ratio of the distal height of the abutment from the base member to the distal height of the top of the shelter from the base member is between 0.6 and 0.8.

DETAILED DESCRIPTION OF THE INVENTION

Definitions

Figure 1:
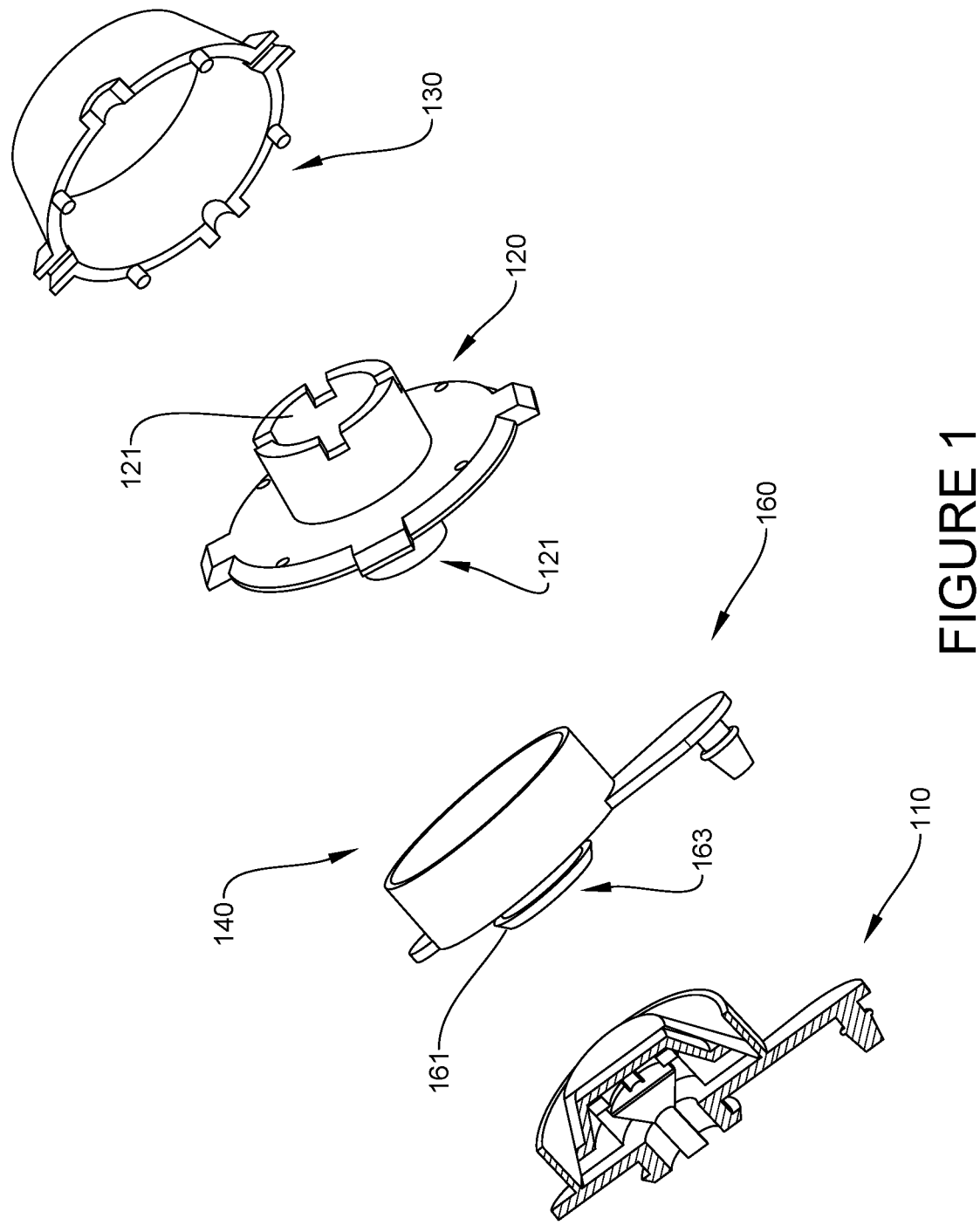
FIG. 1 illustrates a cutaway of a gas-liquid separating gas exchange device and non-limiting three-dimensional components of the device including a gas-exchange vent mechanism, a shelter sheltering the gas-exchange vent mechanism, an abutment encompassing both the shelter and the gas-exchange vent mechanism, fluid-exchange passageways, and a base member comprising a mechanism for attachment to a housing.

Ventilation means may include and is not limited to a hole, a through-hole, a vent hole, an orifice, a passage, a passageway, an opening, a valve, a channel, a ventilation mechanism, a breathing mechanism, an intake, an exhaust, an obstructed hole, a poppet, a control valve, or any other ventilation means. A vent may be enclosed, or partially enclosed, or not enclosed.

Sheltering means may include and is not limited to a shroud, a hood, a shed, a boss, a veil, a shield, a collar, a wall, a barrier, an annular wall, an annular barrier, a radial wall, a radial barrier, or any other sheltering means.

Area-enclosing means may include and is not limited to an enclosing abutment, a partially-enclosing abutment, a full skirt, a partial skirt, a wall, a partial wall, an annular wall, a radial wall, a barrier, a partial barrier, an annular barrier, a radial barrier, a collection of barriers, a collection of barriers having space between barriers, or any other area-enclosing means.

A brake actuator and related terms may include and is not limited to a brake actuating chamber, a brake actuating cylinder, a brake actuator housing, a spring brake, a sealed brake actuator, an air-tight brake actuator, a non-sealed brake actuator, a partially-sealed brake actuator, a diaphragm-diaphragm brake actuator, a diaphragm-piston brake actuator, a pressurized brake actuator, a non-pressurized brake actuator, an S-cam brake actuator, an air disc brake system actuator, or similar technology.

A spring may include and is not limited to a spring, a coil, a helix, a biasing means, a helical structure, a spiral structure, an elastic structure. A spring may contract, expand, retract, have flexible characteristics, have supporting characteristics, be a unit, be a member, or be a compression spring, among others.

A plug may include and is not limited to a plug, a packer, a seal, a stopper, a blocker, a cap, a closure, a cork, a grommet, a restricting member, a filter, a protrusion, an aperture, a shroud, a hood, a shed, a veil, a shield, a collar, a disk, a barrier, a wall. A plug may be annular, radial or other shape.

Resilient deformable materials may include and are not limited to rubber, plastic, polymers, polysiloxane, polyphosphazene, low-density or high-density polyethylene, polyvinyl chloride, polystyrene, nylon, Nylon 6, Nylon 6,6, polytetrafluoroethylene, thermoplastic polyurethanes, polypropylene, polystyrene (thermocole), polytetrafluoroethylene, polyvinyl chloride, polychlorotrifluoroethylene, and other resilient deformable materials.

Hard plastic components may include and are not limited to polyhexamethylene adipamide, acrylonitrile butadiene styrene (ABS), polyactic acid (PLA), polyvinyl alcohol (PVA), polyethylene terephthalate (PET), polyethylene cotrimethylene terephthalate (PETT), high impact polystyrene (HIPS), polycarbonate (PC), polymethyl methacrylate, nylon, Nylon 6, Nylon 6,6, and polyoxymethylene.

A Gas-Liquid Separating Gas Exchange Device

A first non-limiting aspect of the present invention provides a gas-liquid separating gas exchange device. In a non-limiting embodiment, the gas exchange device comprises (1) at least one vent mechanism that services gas exchange for at least one housing, (2) at least one shelter of the vent mechanism distal from the housing that provides at least one sheltered area distal to the vent mechanism, (3) at least one at least partial area-enclosing abutment rising distally from the housing and at least partially enclosing at least the at least one shelter and the distal portion of the at least one vent mechanism, and (4) at least one fluid-exchange passageway within the at least one shelter allowing fluid exchange between the at least one sheltered area and the at least one abutment.

In a non-limiting embodiment, the gas exchange device further comprises at least one base member. In a non-limiting embodiment, the at least one vent mechanism comprises at least one through-hole through a through-opening in the at least one base member. In a non-limiting embodiment, the at least one base member provides at least one attachment device for attachment of the gas exchange device to the housing. In a non-limiting embodiment, the attachment device allows for attachment of the gas exchange device to at least one opening in the housing. In a non-limiting embodiment, the base member comprises an attachment mechanism with some elasticity to promote reversible attachment and removal of the base member from the housing. The base member may comprise texturing, knurling, rings, sealing rings, or similar irregularities to promote reversible attachment and removal. In a non-limiting embodiment, the base member comprises at least one knurl.

In a non-limiting embodiment, the base member is constructed in an integral manner from a resilient elastomeric material. In a non-limiting embodiment, the base member comprises an attachment mechanism as a retention portion which can be assembled in a positive-locking manner with resilient deformation in an associated through-opening in the housing of a spring brake actuator. In a non-limiting embodiment, the retention portion may be in the form of a retention pin. The base member may likewise comprise a resilient material to be retained in a positive locking manner in the central through-opening in an actuator housing by way of a retention portion comprising an undercut cross-section or knurl. The retention portion may be resiliently deformed from the outer side when the base member is reversibly introduced into the through-opening in order to protrude inside the spring chamber in a manner engaging over an inner edge of the through-opening. In a non-limiting embodiment, the retention portion of the base member may be constructed in a conical manner and may taper proximally in the direction of the inner side of the housing. In a non-limiting embodiment, the base member may comprise a stabilizing extension arm extending outward from the retention portion of the base member and comprising a resilient deformable annular and tubular stem further comprising an attachment knurl, attachment wedge, attachment cone, or other attachment means for insertion in a corresponding stem attachment receiving hole in the housing. A tubular stem may be a hollow tubular stem. Any attachment mechanism understood by one of skill in the art may be incorporated into the base member as an attachment to a housing or may be incorporated into any portion of gas-liquid separating gas exchange device as an attachment to a housing. An attachment mechanism may include a threaded portion, a fitted portion, a clasping portion, or any other attaching portion.

In a non-limiting embodiment, the base member may fully encase and encompass the at least one vent mechanism and the at least one shelter and while encasing and encompassing may provide openings for the at least one fluid-exchange passageway and the at least one vent mechanism. The at least one vent mechanism and the at least one shelter may together comprise a hard core central element of the gas-liquid separating gas exchange device. In a non-limiting embodiment, the base member fully encasing and encompassing the at least one vent mechanism and the at least one shelter may be integrally constructed with the at least one area-enclosing abutment. In a non-limiting embodiment, the base member with integrated at least one area-enclosing abutment may be injection molded around the at least one vent mechanism and the at least one shelter together forming a hard core central element or a rigid core central element while the base member comprises openings for operation of the at least one fluid-exchange passageway and the at least one vent mechanism. The rigid or hard core central element may be constructed of relatively hardened or rigid or both hardened and rigid material while the encompassing base member may be constructed of relatively resilient and reversibly deformable material.

In a non-limiting embodiment, the retention portion of the base member may be constructed from a different material from other portions of the base member. In a non-limiting embodiment, the tubular stem may be constructed from a different material from other portions of the base member. In a non-limiting embodiment, the base member and the at least one abutment may be integrally constructed as one continuous piece while encasing and encompassing the at least one vent mechanism and the at least one shelter and while providing openings for the at least one fluid-exchange passageway and the at least one vent mechanism. The integrally constructed base member and abutment may be injection molded and may be injection molded polyvinyl chloride (PVC).

In a non-limiting embodiment, the base member may be comprised of polyvinyl chloride (PVC). In a non-limiting embodiment, the base member may be injection molded. In another non-limiting embodiment, the base member may be injection molded where the molding includes the at least one abutment and the molding encompasses the at least one shelter and the at least one vent mechanism while maintaining openings for the at least one fluid-exchange passageway and the at least one vent mechanism.

In a non-limiting embodiment, the at least one vent mechanism is any means for exchanging a gas from one area to another. In a non-limiting embodiment, the at least one vent mechanism comprises a through-hole, a vent hole, an aperture, an orifice, a passage, an opening, a valve, a passageway, a channel, a ventilation mechanism, a breathing mechanism, an intake, an exhaust, an obstructed hole, a poppet, a control valve, a two-way valve, a two-way hole valve, a two-way slit valve, a diaphragm valve, or any other means, mechanism, or device capable of exchanging gas from a high-pressure environment to a low-pressure environment.

In a non-limiting embodiment, the at least one vent mechanism comprises a plurality of breathing apertures distal and axial to a vent through-hole that vents from the interior of the housing through to the plurality of breathing apertures and into the sheltered area. The vent through-hole may be square, rectangular, angular, rounded, tubular, conical, partially tubular and partially conical, or any other gas conducting shape and may extend distally from the interior of the housing through a hole in the housing to the plurality of breathing apertures. The plurality of breathing apertures may be arranged axially from the tubular through-hole. The plurality of breathing apertures axial from the through-hole may comprise at least two, three, four, five, six, seven, eight or more breathing apertures. In a non-limiting embodiment, the breathing apertures may be equally axially spaced from a tubular through-hole. In a non-limiting embodiment, the tubular through-hole may become conical in shape enlarging distally from the housing and may be capped by abutting the covering of the shelter where the plurality of breathing apertures extend perpendicularly from the tubular through-hole beneath the shelter covering through the sidewalls of the vent mechanism and into the sheltered area.

In a non-limiting embodiment, the at least one vent mechanism may comprise a tubular central axial structural portion comprising a through-hole and an annular flange extending from the tubular central axial structural portion outward for fixation with, upon, or in the at least one shelter, the at least one base member, the at least one abutment, or any combination thereof. The at least one vent mechanism may comprise a proximal tubular portion comprising an axial through-hole, a distal tubular portion comprising an axial through-hole becoming conical in shape and enlarging distally until reaching the covering of the at least one shelter, and an annular flange positioned at the junction of the proximal tubular portion and the distal tubular portion. The annular flange may comprise one or more receiving holes for insertion of attachment posts from any attaching at least one shelter or attaching at least one base member or other portion of the gas-liquid separating gas exchange device.

In a non-limiting embodiment, the annular flange may comprise a plurality of equally axially spaced receiving holes. In a non-limiting embodiment, the plurality of equally axially spaced receiving holes may be four equally spaced receiving holes. In a non-limiting embodiment, the flange may comprise attaching posts in place of the receiving holes. In a non-limiting embodiment, the flange may comprise any attachment means for attaching to the shelter, the abutment, the base member, any other portion of the gas-liquid separating gas-exchange device, or any combination thereof. In a non-limiting embodiment, the annular flange may also comprise one or more tabs providing a foundation for any fluid-exchange passageway within the at least one shelter. The annular flange may comprise four equally axially spaced tabs providing four foundations for four fluid-exchange passageways within the at least one shelter.

The at least one vent mechanism may be made as a portion of a hard core central element for the gas-liquid separating gas exchange device. In a non-limiting embodiment, the hard core central element may include at least one vent mechanism and at least one shelter comprising at least one fluid-exchange passageway. In a non-limiting embodiment, the hard core central element may include a vent mechanism and a shelter comprising a plurality of fluid-exchange passageways or at least four fluid-exchange passageways or at least five or six or seven or eight or more fluid-exchange passageways, non-limitingly equally axially spaced. In a non-limiting embodiment, the at least one vent mechanism may be comprised of any hard or rigid material. In a non-limiting embodiment, the at least one vent mechanism may be comprised of PA66 polyhexamethylene adipamide, commonly known as Nylon 66. In a non-limiting embodiment, the at least one shelter may be comprised of any hard material. In a non-limiting embodiment, the at least one shelter may be comprised of PA66 polyhexamethylene adipamide, commonly known as Nylon 66.

In a non-limiting embodiment, the ratio of the distal height of the top of any fluid-exchange passageway to the distal height of the bottom of the breathing apertures is about 0.2, 0.3, 0.4, 0.5, 0.6, 0.7, 0.8, or 0.9. In a non-limiting embodiment, the ratio is about 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, or 0.59. In a non-limiting embodiment, the ratio is about 0.48 or 0.49. In a non-limiting embodiment, the ratio is 0.487.

In a non-limiting embodiment, the ratio of the distal height of the bottom of the breathing apertures from the bottom of the sheltered space to the distal height of the top of the vent mechanism from the bottom of the sheltered space is about 0.2, 0.3, 0.4, 0.5, 0.6, 0.7, 0.8, or 0.9. In a non-limiting embodiment, the ratio is 0.66, 0.67, 0.68, 0.69, 0.70, 0.71, 0.72. 0.73, 0.74, 0.75, 0.76, 0.77, 0.78, 0.79, 0.80, 0.81, 0.82, 0.83, 0.84, 0.85, or 0.86. In a non-limiting embodiment, the ratio is about 0.75, 0.76, 0.77, 0.78, or 0.79. In a non-limiting embodiment, the ratio is 0.769.

In a non-limiting embodiment, the ratio of the distal height of opening of the breathing apertures to the distal height of the top of the vent mechanism from the bottom of the sheltered space is about 0.05, 0.10, 0.15, 0.20, 0.25, 0.35, 0.40, 0.45, 0.50, 0.55, or 0.60. In a non-limiting embodiment, the ratio is about 0.13, 0.14, 0.15, 0.16, 0.17, 0.18, 0.19, 0.20, 0.24, 0.25, 0.26, 0.27, 0.28, 0.29, 0.30, 0.31, 0.32, or 0.33. In a non-limiting embodiment, the ratio is about 0.21, 0.22, 0.23, 0.24, 0.25, or 0.26. In a non-limiting embodiment, the ratio is 0.23.

In a non-limiting embodiment, the ratio of the distal height of breathing apertures from the base member to the distance from the distal bottom of the vent mechanism to the distal top of the vent mechanism is about 0.2, 0.3, 0.4, 0.5, 0.6, 0.7, 0.8, or 0.9. In a non-limiting embodiment, the ratio is about 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, or 0.59. In a non-limiting embodiment, the ratio is about 0.48 or 0.49. In a non-limiting embodiment, the ratio is 0.482.

In a non-limiting embodiment, the ratio of the total area of the breathing apertures to total area of the top of cone of the vent mechanism is about 0.05, 0.06, 0.07, 0.08, 0.09, 0.10, 0.11, 0.12, 0.13, 0.14, or 0.15. In a non-limiting embodiment, the ratio is 0.12 or 0.13. In a non-limiting embodiment, the ratio is 0.124.

In a non-limiting embodiment, the angle of the tip cone in the distal portion of the vent mechanism is about 20, 30, 40, 50, 60, 70, or 80 degrees. In a non-limiting embodiment, the angle is about 55, 56, 57, 58, 59, 60, 61, 62, 63, 64, 65, 66, 67, 68, or 69 degrees. In a non-limiting embodiment, the angle is about 60, 61, 62, 63, or 64 degrees. In a non-limiting embodiment, the angle is 62 degrees.

In a non-limiting embodiment, a seat may be comprised within the cone of the vent mechanism. The seat may be annular and may have a diameter of 0.6 inches and straight annular walls having a distal height from the seat base to the distal end of the vent mechanism of 0.24 inches and a distal height to the proximal end of the breathing apertures of 0.14 inches with the breathing apertures having a distal height of 0.1 inches. The seat may be sized to fit a valve internal to the vent mechanism and within the through-hole of the vent mechanism. The valve may be a two-way valve. The valve may have a relatively thin distal height from the seat such as, for example, 0.0472 inches and may comprise an exterior ring of thicker and stiffer composition having a distal height or thickness from the seat of 0.0472 inches and an interior bed of thinner and more flexible composition having a thickness of 0.0236. The interior bed of thinner and more flexible composition may comprise a resilient and reversibly-deformable two-way slit valve or two-way incision valve allowing gas exchange in both directions at about the same extant pressure differential across the valve. The two-way slit valve or two-way incision valve may be comprised of 50 Shore '00' Polyurethane or other material known to one of skill in the art.

In a non-limiting embodiment, the ratio of the distance of breathing apertures to the sidewall of the shelter from the center of the vent mechanism is about 0.2, 0.3, 0.4, 0.5, 0.6, 0.7, 0.8, or 0.9. In a non-limiting embodiment, the ratio is about 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, or 0.51. In a non-limiting embodiment, the ratio is about 0.41, 0.42, or 0.43. In a non-limiting embodiment, the ratio is 0.42.

In a non-limiting embodiment, the at least one shelter of the vent mechanism distal from the housing is a shroud, a hood, a shed, a veil, a shield, a collar, a wall, a barrier, a boss, an annular wall, an annular barrier, a radial wall, a radial barrier, or any means, mechanism, or device for sheltering the vent.

In a non-limiting embodiment, the at least one shelter comprises sidewalls axial to the vent mechanism, rising distally from the housing and the at least one base member, and sheltering the vent mechanism by providing a distal cover and axial and distal sidewalls for the sheltered area sheltering the vent mechanism. In a non-limiting embodiment, the shelter is an annular shelter with distal cover. In a non-limiting embodiment, the shelter is an annular shelter with sloping side walls. In a non-limiting embodiment, the sidewalls taper conically in the distal direction such that the area encompassed by the sidewalls is greater proximally and lesser distally and greater at the juncture with the base member and lesser at the juncture (or approachment) with the distal cover of the shelter. In a non-limiting embodiment, the angle of annular shelter wall to the base member is about 20, 30, 40, 45, 50, 60, 70, or 80 degrees. In a non-limiting embodiment, the angle is about 51, 52, 53, 54, 55, 56, 57, 58, 59, 60, 61, 62, 63, 64, 65, 66, 67, 68, 69, or 70 degrees. In a non-limiting embodiment, the angle is about 60, 61, 62, 63, or 64 degrees. In a non-limiting embodiment, the angle is 62 degrees. In a non-limiting embodiment, the at least one shelter of the vent mechanism distal from the housing is at least one boss.

In a non-limiting embodiment, the at least one shelter may comprise one or more attachment posts at the proximal end of the at least one shelter for attaching to one or more corresponding receiving holes in any annular flange portion of a vent mechanism or comprise receiving holes at the distal end of the at least one shelter for attachment of one or more corresponding attachment posts in any annular flange portion of a vent mechanism. In a non-limiting embodiment, the one or more attachment posts or receiving holes may be equally axially spaced on the distal end of the annular sidewall of the at least one shelter and may correspond to equally axially spaced receiving holes or attachment posts in the annular flange portion of the vent mechanism. In a non-limiting embodiment, the plurality of equally axially spaced attachment posts or receiving holes may be four equally axially spaced attachment posts or receiving holes, or five, six, seven, or eight equally axially spaced attachment posts or receiving holes.

The at least one shelter may also comprise one or more half-tubular domed fluid-exchange passageways wherein the half-tubular domed passageways integrally extend out of the proximal portion of the annular sidewall of the at least one shelter. The at least one half-tubular domed passageway may comprise at least two, three, or four half-tubular domed passageways within the at least one shelter, which may correspond to at least two, three, or four equally axially spaced tabs providing two, three, or four foundations for the two, three, or four fluid-exchange passageways within the at least one shelter. The at least one half-tubular domed passageway may comprise at least five, six, seven, eight or more half-tubular domed passageways with, non-limitingly, corresponding foundations. The at least one shelter may be made as a portion of a hard core central element for the gas-liquid separating gas exchange device. In a non-limiting embodiment, the at least one shelter may be comprised of any hard material. In a non-limiting embodiment, the at least one shelter may be comprised of PA66 polyhexamethylene adipamide, commonly known as Nylon 66.

In a non-limiting embodiment, the at least one at least partial area-enclosing abutment is at least partially axial to the vent mechanism or fully axial to the vent mechanism and at least partially encompassing or fully encompassing at least the distal portion of the vent mechanism and the shelter of the vent mechanism. In a non-limiting embodiment, the at least partial area-enclosing abutment is an annular abutment enclosing at least the distal portion of the vent mechanism and the shelter of the vent mechanism. In a non-limiting embodiment, the at least one abutment is an annular skirt axial to the vent mechanism rising distally from the housing. In a non-limiting embodiment, the skirt is an annular full skirt fully circumferentially encompassing the distal end of the vent and the shelter of the vent. In a non-limiting embodiment, the shelter is a boss encompassing the vent and the skirt encompasses the boss, which encompasses at least the distal end of the vent.

In a non-limiting embodiment, the at least one shelter may extend distally from the housing beyond the distal distance of the abutment from the housing by 1%, 2%, 3%, 4%, 5%, 10%, 20%, 30%, 40%, 50%, 60%, 70%, 80%, 90%, 100%, or more of the distal distance of the abutment from the housing. In a non-limiting embodiment, the at least one shelter may extend distally from the housing beyond the distal distance of the abutment from the housing by an additional 1.05, 1.10, 1.15, 1.2, 1.25, 1.3, 1.4, 1.5, 2.0, 2.5, or 3.0 times the distal distance of the abutment from the housing.

In a non-limiting embodiment, the ratio of the height of the abutment from the base member to the height of the top of the shelter from the base member (all measured distally from the housing) is about 0.3, 0.4, 0.5, 0.6, 0.7, 0.8, or 0.9. In a non-limiting embodiment, the ratio is between 0.6 and 0.8. In a non-limiting embodiment, the ratio is about 0.71, 0.72, 0.73, 0.74, 0.75, 0.76, 0.77, 0.78, or 0.79. In a non-limiting embodiment, the ratio is 0.722. In a further non-limiting embodiment, the ratio is 0.714. In a non-limiting embodiment, the distal height of abutment from the base member is 0.500. In a non-limiting embodiment, the distal height of the shelter from the base member is 0.700.

In a non-limiting embodiment, the at least one at least partial area-enclosing abutment comprises a junction with the sidewalls of the at least one shelter to create at least one fluid-catchment space at the junction. In a non-limiting embodiment, at least one fluid-exchange passageway is present in the sidewalls of the at least one shelter providing fluid exchange passage between the sheltered space and the fluid-catchment junction and, thereby, to the atmosphere exterior to the sheltered space. In a non-limiting embodiment, the fluid-catchment junction is at an angle of 20, 30, 40, 45, 50, 60, 70, or 80 degrees with the at least one area-enclosing abutment. In a non-limiting embodiment, the angle is about 10, 15, 20, 25, or 30 degrees. In a non-limiting embodiment, the angle is about 25, 26, 27, 28, 29, 30, 31, 32, 33, 34, or 35 degrees. In a non-limiting embodiment, the angle is 28 degrees.

In non-limiting embodiment, the at least one fluid-exchange passageway within the sidewalls of the at least one shelter allowing fluid exchange between the at least one sheltered area and the at least one abutment is any means, mechanism, or device capable of allowing fluid to exchange between the at least one sheltered area and the at least one abutment of the gas-liquid separating gas exchange device. In a non-limiting embodiment, the at least one fluid-exchange passageway is at least one hole, at least two holes, at least three holes, at least four holes, at least five holes, at least six holes, or more. In a non-limiting embodiment, the at least one fluid exchange passageway is at least one hole, vent hole, filtered hole, orifice, passage, opening, valve, passageway, channel, ventilation device, breathing device, intake device, exhaust device, obstructed hole, poppet, control valve, or any other means, device, or mechanism for fluid exchange. In a non-limiting embodiment, the at least one fluid-exchange passageway is at least one half-tubular domed passageway integrally extending out from the at least one shelter having a foundation of a corresponding at least one tab on the flange of the at least one vent mechanism.

In a non-limiting embodiment, the ratio of the distal height of the top of the fluid-exchange passageway from the base member to the distal height of the top of the abutment from the base member is about 0.1, 0.2, 0.3, 0.4, 0.5, 0.6 or 0.7. In a non-limiting embodiment, the ratio is about 0.35, 0.36, 0.37, 0.38, 0.39, 0.40. 0.41, 0.42, 0.43, 0.44, or 0.45. In a non-limiting embodiment, the ratio is 0.408.

In a non-limiting embodiment, the ratio of the distal height of the bottom of the breathing apertures in the vent mechanism to distal height of the top of fluid exchange passageways is about 0.1, 0.2, 0.3, 0.4, 0.5, 0.6 or 0.7. In a non-limiting embodiment, the ratio is about 0.40. 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, or 0.60. In a non-limiting embodiment, the ratio is about 0.48 or 0.49. In a non-limiting embodiment, the ratio is 0.487.

In a non-limiting embodiment, the ratio of the total area of the opening of the breathing apertures to the total area of vent through-hole at top of cone of the vent mechanism is about 0.05, 0.06, 0.07, 0.08, 0.09, 0.10, 0.11, 0.12, 0.13, 0.14, 0.15, 0.16, 0.17, 0.18, 0.19, 0.20. In a non-limiting embodiment, the ratio is about 0.12 or 0.13. In a non-limiting embodiment, the ratio is 0.124.

In a non-limiting embodiment, the angle of the virtual apex of the cone in the vent mechanism is about 50, 51, 52, 53, 54, 55, 56, 57, 58, 59, 60, 61, 62, 63, 64, 65, 66, 67, 68, 69, 70, 71, 72, 73, or 74 degrees. In a non-limiting embodiment, the angle is about 60, 61, 62, 63, 64, 65, 66, 67, or 68 degrees. In a non-limiting embodiment, the angle is 64 degrees.

In a non-limiting embodiment, the ratio of the distance of the breathing apertures from the center axis of the vent mechanism to the distance of the sidewall of shelter from the center axis of the vent mechanism is about 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.40, 0.51, or 0.52. In a non-limiting embodiment, the ratio is about 0.40, 0.41, 0.42, 0.43, or 0.44, or 0.42.

In a non-limiting embodiment, the ratio of the distal height of the top of the opening of the fluid-exchange passageway from the base member to the distal height of the bottom of the shelter cap from the base member is about 0.2, 0.3, 0.4, 0.5, 0.6, 0.7, or 0.8. In a non-limiting embodiment, the ratio is about 0.31, 0.32. 0.33. 0.34, 0.35, 0.36, 0.37, 0.38, 0.39, 0.40, 0.41, 0.42. 0.43, 0.44, 0.45, 0.46, 0.47, 0.48, or 0.49. In a non-limiting embodiment, the ratio is about 0.38 or 0.39. In a non-limiting embodiment, the ratio is 0.388. In a further non-limiting embodiment, the distal height from the base member to the top of the four fluid exchange passageways is 0.200 and the distal height from the base member to the distal bottom of the shelter is 0.512. In a non-limiting embodiment, the ratio of the distal height from the base member to the top of the four fluid exchange passageways and the distal height from the base member to the distal bottom of the shelter is 0.390.

In a non-limiting embodiment, the ratio of the distal height of the top of the opening of the fluid-exchange passageway from the bottom of the sheltered space to the distal height of the bottom of the breathing aperture from the bottom of the sheltered space is about 0.2, 0.3, 0.4, 0.5, 0.6, 0.7, or 0.8. In a non-limiting embodiment, the ratio is about 0.27, 0.28, 0.29, 0.30, 0.31, 0.32. 0.33. 0.34, 0.35, 0.36, 0.37, 0.38, 0.39, 0.40, 0.41, 0.42. 0.43, 0.44, 0.45, 0.46, or 0.47. In a non-limiting embodiment, the ratio is about 0.35, 0.36, 0.37, 0.38, or 0.39. In a non-limiting embodiment, the ratio is 0.370.

In a non-limiting embodiment, the gas-liquid separating gas exchange device is oriented at an angle from perpendicular to the force of gravity such that (1) liquid present in the fluid-catchment junction may migrate over the abutment and out of the gas-liquid separating gas exchange device as liquid rises within the area enclosed by the abutment to a point at which it may overflow the distal portion of the abutment before substantially entering the breathing apertures of the vent mechanism, (2) liquid present in the fluid-catchment junction may be shaken over the abutment and out of the gas-liquid separating gas exchange device as vibrational energy is applied to the device before substantially entering the breathing apertures of the vent mechanism, or (3) liquid present in the fluid-catchment junction may proceed over the abutment and out of the gas-liquid separating gas exchange device through a combination of gravity and vibrational forces before substantially entering the breathing apertures of the vent mechanism. In a non-limiting embodiment, the angle from perpendicular to the force of gravity is about 1, 2, 3, 4, 5, 10, 20, 30, 40, 45, 50, 60, 70, 80, 90, 100, 120, 130, 135, 140, 150, 160, 170, 175, 176, 177, 178, 179, or 180 degrees. In a non-limiting embodiment, the angle from perpendicular to the force of gravity is no less than 45, 40, 35, 30, 25, 20, 15, 10, 5, 4, 3, 2, or 1 degrees. In a non-limiting embodiment, the angle is no less than 7, 6, 5, or 4 degrees. In a non-limiting embodiment, the angle is no less than about 7 degrees or no less than 7 degrees.

In a non-limiting embodiment, the gas-liquid separating gas exchange device is oriented at a sufficient angle to the force of gravity such that liquid present in the fluid-catchment junction may migrate over the abutment and out of the gas-liquid separating gas exchange device before rising within the area enclosed by the abutment and therefore within the sheltered area within the shelter to a point at which the liquid would enter any one of the plurality of breathing apertures at the distal end of the at least one vent mechanism thereby overflowing through the vent mechanism through-hole into the housing. In a non-limiting embodiment, the gas-liquid separating gas exchange device is oriented at a sufficient angle to the force of gravity in combination with energy of vibration such that liquid will exit the device before entering any one of the plurality of breathing apertures at the distal end of the at least one vent mechanism and overflowing through the vent mechanism through-hole into the housing.

In a non-limiting embodiment, the interior surfaces of the device exhibit surface characteristic that are slick and non-adhering. In a non-limiting embodiment, the surfaces exhibit characteristics providing self-cleaning and easy-release properties for gravitational, vibrational, and air-pressure exerted flow of contaminating liquids and debris. In a non-limiting embodiment, the surfaces exhibit characteristics that are resistant to triboelectric charging, i.e., demonstrating anti-static characteristics. In a non-limiting embodiment, contaminants move easily by force of gravity, vibration, air pressure or any combination thereof out of the housing, through the vent mechanism, out of the shelter through the fluid-exchange passageways, into the fluid-catchment junctions, and out, over, or along the abutment and out of the device.

In a non-limiting embodiment, interior surfaces have an anti-static volume resistivity of $10^{10}$-$10^{12}$ Ohm/cm. In a non-limiting embodiment, interior surfaces may have a volume resistivity of $10^{12}$ or higher, such as, for example, volume resistivity similar to Nylon 66.

In a non-limiting embodiment, interior surfaces of the device have a roughness measurement Ra (μm) of less than 6.3 (ISO N9). In a non-limiting embodiment, interior surfaces of the device have a roughness of less than Ra 3.2 μm (ISO N8). In a non-limiting embodiment, interior surfaces have a roughness of less than Ra 1.6 μm (ISO N7). In a non-limiting embodiment, interior surfaces have a roughness of less than Ra 0.8 μm (ISO N6), Ra 0.4 μm (ISO N5), Ra 0.2 μm (ISO N4), Ra 0.1 μm (ISO N3), Ra 0.05 μm (ISO N2), or Ra 0.025 μm (ISO N1). In a non-limiting embodiment, interior surfaces have a roughness of less than 0.012 μm. In a non-limiting embodiment, interior surfaces have roughness of about Ra 1.6 μm (ISO N7) or Ra 1.6 μm.

In a non-limiting embodiment, the abutment is constructed of flexible material allowing vibrational forces to produce micro-slinging of fluid and solid contaminants away from the abutment and out of the device. In a non-limiting embodiment, the abutment is constructed of material having a modulus of elasticity (flexibility) of between 0.001 GPa (gigapascals $kN/mm^2$) and 6.00 GPa. In a non-limiting embodiment, the abutment is constructed of material having a flexibility of between 0.001 GPa and 3.50 GPa between 0.01 and 2.00 GPa, between 0.10 and 1.00 GPa, between 0.20 and 0.90 GPa, or between 0.30 and 0.50 GPa. In a non-limiting embodiment, the abutment is constructed of material having a flexibility of between 3.00 and 4.00 GPa or 3.14 and 3.92 GPa.

In a non-limiting embodiment, the gas-liquid separating gas exchange device is an air-water separating air exchange device.

A non-limiting embodiment provides an air-water separating air exchange device for attachment to an opening in an emergency air brake actuator housing. In a non-limiting embodiment, the air-water separating air exchange device is a reversibly-removable device. In a non-limiting embodiment, the air-water separating air exchange device comprises at least one base member. In a non-limiting embodiment, the base member comprises a device for attaching the air-water separating air exchange device within an opening in the emergency air brake actuator housing. In a non-limiting embodiment, the opening in the emergency air brake actuator housing is a caging tool opening.

In a non-limiting embodiment, the air exchange device comprises at least one distally-protruding shelter that provides a sheltered space distal to the actuator housing and distal to the at least one vent mechanism. In a non-limiting embodiment, the at least one shelter shelters the sheltered space from liquid, moisture, and debris exterior to the shelter. In a non-limiting embodiment, the at least one shelter is at least one boss.

A non-limiting embodiment provides at least one venting mechanism between the interior atmosphere of the housing and the atmosphere exterior to the housing. In a non-limiting embodiment, sufficient vent openings provide air exchange between the sheltered space and the interior of the actuator housing. In a non-limiting embodiment, the vent openings provide air exchange between the sheltered space and the interior of the actuator housing and the sheltered space is in fluid communication with the outside atmosphere such that the vent openings provide air exchange between the outside atmosphere and the interior of the actuator housing.

A Gas-Liquid Separating Gas Exchange Device with a Ventilation Means, a Sheltering Means, an Area-Encompassing Means and a Fluid-Exchange Means A second non-limiting aspect of the present invention provides a gas-liquid separating gas exchange device comprising (1) at least one ventilation means for providing gas exchange for at least one housing, (2) at least one sheltering means for providing shelter of the at least one ventilation means, (3) at least one area-encompassing means rising distally from the housing and axially encompassing at least the at least one sheltering means and the portion of the at least one ventilation means that is exterior to the housing, and (4) at least one fluid-exchange means allowing fluid exchange between the at least one sheltering means and the at least one area-enclosing means.

In a non-limiting embodiment, the sheltering means provides a sheltered space comprising the ventilation means wherein liquid within said sheltered space may evacuate said sheltered space via the force of gravity, air pressure, or vibration or a combination thereof and gases may exchange between the atmosphere outside of the gas-liquid separating gas exchange device and the sheltered space through the fluid exchange means and gases may further exchange from the sheltered space through the ventilation means between the interior and exterior of the housing.

Air Brake Actuator Housing with Air-Water Separating Air Exchange Device

A third non-limiting aspect of the present invention provides an air-water separating air exchange device as part of an emergency air brake actuator housing comprising (1) at least one vent mechanism that services air exchange for at least one housing, (2) at least one shelter of the vent mechanism distal from the housing that provides at least one sheltered area distal to the vent mechanism, (3) at least one at least partial area-enclosing abutment rising distally from the housing and at least partially enclosing at least the at least one shelter and the distal portion of the at least one vent mechanism, (4) at least one fluid-exchange passageway within the at least one shelter allowing fluid exchange between the at least one sheltered area and the at least one abutment, and (5) at least one base member comprising at least one aperture for the at least one vent mechanism and at least one attachment device for attachment of the air exchange device to the housing.

In a non-limiting embodiment, the air-water separating air exchange device further comprises at least one valve device covering or integrated within the at least one vent mechanism. In a non-limiting embodiment, the at least one valve device is a two-way valve device. In a non-limiting embodiment, the at least one valve device is a resilient reversibly-deformable valve device. In a non-limiting embodiment, the resilient reversibly-deformable valve device is a two-way hole valve. In a non-limiting embodiment, it is a two-way slit valve. In a non-limiting embodiment, it is a valve comprising a slit within a bed of a resilient reversibly-deformable flexible material allowing air to exchange when an air pressure differential exists across the bed of flexible material. In a non-limiting embodiment, the bed of flexible material is positioned in the portion of the at least one vent mechanism distal to the housing. In a non-limiting embodiment, the bed of flexible material is positioned in the portion of the at least one vent mechanism proximal to the housing. In a non-limiting embodiment, the bed of flexible material covers the at least one vent mechanism, either distally or proximally.

In a non-limiting embodiment, the bed of flexible material is 50 Shore 'OO' Polyurethane.

In a non-limiting embodiment, the emergency air brake actuator housing may additionally be vented, sealed, or partially sealed by one or more moisture-limiting and debris-limiting removable vent plugs for limiting moisture and debris from entering through breather holes in the brake actuator housing. In a non-limiting embodiment, the emergency air brake actuator housing may be vented, sealed, or partially-sealed by two, three, four, five, six, seven, eight or more moisture-limiting and debris-limiting removable vent plugs. In a non-limiting embodiment, the emergency air brake actuator housing may be vented, sealed, or partially-sealed by four moisture-limiting and debris-limiting removable vent plugs. In a non-limiting embodiment, the moisture-limiting and debris-limiting removable vent plugs comprise a tubular attachment mechanism comprising a proximal resilient deformable annular knurl for positive locking of the removable vent plug inside the breather holes of the housing. In a non-limiting embodiment, the vent plugs comprise a through-hole vent opening with a distal breathing mechanism. In a non-limiting embodiment, the distal breathing mechanism comprises a flexible cross-hatch breathing aperture. In another non-limiting embodiment, the vent plugs comprise a domed elastomeric cap with proximally-directed concave annular channeling and distally-directed annular exterior groove for flexible and removable sealing to the exterior of the brake housing. In a non-limiting embodiment, the vent plugs further comprise a flexible cross-hatch breathing aperture distally capping the through-hole vent opening.

Spring Air Brake Actuator System

A fourth non-limiting aspect of the present invention provides a spring air brake actuator system for heavy duty vehicles comprising an air-water separating air exchange device for incorporation with the emergency brake actuator housing of a spring air brake actuator wherein the air-water separating air exchange device prevents moisture and unwanted contaminants from entering the actuator while urging contaminants from the housing and air exchange device via gravitational, vibrational, and air-pressure forces during use and further allowing air to pass into and out of the actuator. The air-water separating air exchange device may be a plug of the caging tool hole of the spring air brake actuator system.

In a non-limiting embodiment, the housing may additionally be vented, sealed, or partially-sealed by one or more additional moisture-limiting and debris-limiting removable plugs for limiting moisture and debris from entering through breather holes in the brake actuator housing. The plugs may be seal plugs or may be vent plugs. In a non-limiting embodiment, the moisture-limiting and debris-limiting removable vent plugs comprise a tubular attachment mechanism comprising a proximal resilient deformable annular knurl for positive locking of a removable vent plug inside the housing. In a non-limiting embodiment, the vent plugs comprise a domed elastomeric cap with proximally-directed concave annular channeling and distally-directed annular exterior groove for flexible and removable sealing to the exterior of the brake housing. In a non-limiting embodiment, the vent plugs comprise a through-hole vent opening with a distal breathing mechanism. In a non-limiting embodiment, the distal breathing mechanism comprises a flexible cross-hatch breathing aperture. In a non-limiting embodiment, the vent plugs may further comprise a flexible cross-hatch breathing aperture distally capping and venting the through-hole vent opening.

In a non-limiting embodiment, the air brake actuator may comprise a housing, a service diaphragm, a service pushrod, a service spring, a parking diaphragm, a parking push-rod, a parking spring, a caging tool opening, a removable air-water separating air exchange device plug at the caging tool opening, and a plurality of moisture-limiting and debris-limiting plugs inserted at one, two, three, four, five, six, seven, eight or more breather holes in the housing, respectively. In a non-limiting embodiment, the plugs may be vent plugs. In a non-limiting embodiment, the vent plugs are four vent plugs inserted at four breather holes in the housing. The housing may enclose a service brake chamber and a parking brake chamber and may comprise an upper housing, a lower housing, and a central adapter housing. The housing may be held together by a clamp. Mounting bolts may extend from the housing for mounting the actuator within a vehicle.

In a non-limiting embodiment, a caging tool opening of the actuator may be provided for entry of a caging tool to cage the main parking spring before installation or upon failure of an air brake. In a non-limiting embodiment, an air-water separating air exchange device plug is reversibly introduced to the caging tool opening.

Attachable Air-Water Separating Air Exchange Device

A fifth non-limiting aspect of the present invention provides an air-water separating air exchange device comprising (1) at least one vent mechanism that services air exchange in and out of at least one brake actuator housing, wherein the at least one vent mechanism comprises a plurality of breathing apertures distal to the housing and axial to a vent through-hole allowing air to exchange from the interior of the housing into at least one sheltered area and wherein the breathing apertures exit the vent mechanism immediately proximal to a shelter covering, (2) at least one shelter of the vent mechanism distal from the housing that provides at least one sheltered area distal to the vent mechanism, wherein the at least one shelter of the vent mechanism distal from the housing comprises axial sidewalls at least partially in contact or integrated with a base member and rising distally from the housing and comprises at least a distal cover in contact or integrated with the sidewalls where said at least one shelter is annular with sidewalls distally tapering in a conical and narrowing direction to the distal cover where the distal cover is likewise annular, (3) at least one area-enclosing abutment rising distally from the housing enclosing at least the at least one shelter and the distal portion of the at least one vent mechanism, wherein the at least one area-enclosing abutment is axial to the vent mechanism and encompasses at least the distal end of the vent mechanism and the shelter of the vent mechanism and wherein the at least one area-enclosing abutment is annular and axial to the distal end of the vent mechanism rising distally from the housing and wherein the at least one area-enclosing abutment comprises a junction with the at least one shelter of the vent mechanism to provide a fluid-catchment junction between the at least one area-enclosing abutment and the at least one shelter and wherein the fluid-catchment junction is provided at an integrated junction among the at least one shelter, the at least one area-enclosing abutment, and the at least one base member, (4) at least one fluid-exchange passageway within the at least one shelter of the vent mechanism allowing fluid exchange between the at least one sheltered area and the at least one abutment, wherein fluid may exit the at least one sheltered area via movement through the at least one fluid-exchange passageway and may exit the device by moving over the at least one abutment and air may exchange between the interior of the housing and the exterior of the housing through the at least one vent mechanism and through the at least one fluid-exchange passageway and wherein the at least one fluid-exchange passageway provides fluid exchange between the at least one sheltered area and at least one fluid-catchment junction, and (5) at least one base member comprising at least one base-member through-opening integrated with the at least one vent mechanism to allow air exchange between the interior of the housing and the exterior of the housing through the at least one vent mechanism wherein the at least one base member comprises at least one attachment mechanism for attachment of the device to at least one associated through-opening in said housing wherein the base member is constructed in an integral manner from a resilient elastomeric material and comprises a retention portion which can be assembled in a positive-locking manner with resilient deformation to the associated through-opening in the at least one housing and further comprises an extension arm extending outward from the retention portion of the base member and comprising a resilient deformable annular and tubular stem further comprising an attachment mechanism for insertion in a corresponding stem attachment receiving hole in the housing, and wherein the device is oriented at a sufficient angle to the force of gravity in combination with any present vibrational forces such that liquid is substantially deterred from enter any one of the plurality of breathing apertures at the distal end of the at least one vent mechanism and overflows through the vent mechanism through-hole into the housing before exiting the device over the at least one abutment by the force of gravity in combination with the any vibrational or air-pressure forces.

In a non-limiting embodiment, the air-water separating air exchange device further comprises at least one valve device covering or integrated within the at least one vent mechanism. In a non-limiting embodiment, the at least one valve device is a two-way valve device. In a non-limiting embodiment, the at least one valve device is a resilient reversibly-deformable valve device. In a non-limiting embodiment, the resilient reversibly-deformable valve device is a two-way hole valve. In a non-limiting embodiment, it is a two-way slit valve. In a non-limiting embodiment, it is a valve comprising a slit within a bed of a resilient reversibly-deformable flexible material allowing air to exchange when an air pressure differential exists across the bed of flexible material. In a non-limiting embodiment, the bed of flexible material is positioned in the portion of the at least one vent mechanism distal to the housing. In a non-limiting embodiment, the bed of flexible material is positioned in the portion of the at least one vent mechanism proximal to the housing. In a non-limiting embodiment, the bed of flexible material covers the at least one vent mechanism, either distally or proximally.

Method of Manufacture of an Air-Water Separating Air Exchange Device

A sixth non-limiting aspect of the present invention provides a method of manufacture of a gas-liquid separating gas exchange device. In a non-limiting embodiment, the method of manufacture comprises the steps of (1) providing at least one vent mechanism that may service gas exchange for at least one housing, (2) providing at least one shelter of the vent mechanism that may be distal from the housing that provides at least one sheltered area distal to the vent mechanism, (3) providing at least one at least partial area-enclosing abutment that may rise distally from the housing and at least partially enclose at least the at least one shelter and the distal portion of the at least one vent mechanism, (4) providing at least one fluid-exchange passageway within the at least one shelter allowing fluid exchange between the at least one sheltered area and the at least one abutment, (5) providing at least one base member, and (6) manufacturing the gas-liquid separating gas exchange device by combining the at least one vent mechanism, the at least one shelter, the at least one area-enclosing abutment, the at least one fluid-exchange passageway, and the at least one base member into a manufactured gas-liquid separating gas exchange device.

In a non-limiting embodiment, the method comprises the step of combining the at least one vent mechanism and the at least one shelter into a hard core of the gas-liquid separating gas exchange device. In a non-limiting embodiment, the hard core may include at least one vent mechanism and at least one shelter comprising at least two, three, four, or more axially-spaced fluid-exchange passageways. In a non-limiting embodiment, the hard core is constructed of Nylon 6,6. In a non-limiting embodiment, the method comprises the step of encasing the hard core within an integrally-constructed base member with integrated at least one area-enclosing abutment where the axially-spaced fluid-exchange passageways are maintained. In a non-limiting embodiment, the method comprises injection molding the integrally-constructed base member with integrated at least one area-enclosing abutment around the hard core while maintaining the fluid-exchange passageways. The injection molding material may be flexible. It may likewise be resilient and deformable. It may be constructed from, for example, PVC.

A Method of Separating Gas from Liquid while Providing Gas Exchange for a Housing A seventh non-limiting aspect of the present invention provides a method of separating gas from liquid while providing gas exchange for a housing. In a non-limiting embodiment, the method comprises the steps of (1) providing at least one vent mechanism that may service gas exchange for the housing, (2) providing at least one shelter of the vent mechanism that may be distal from the housing that provides at least one sheltered area distal to the vent mechanism, (3) providing at least one at least partial area-enclosing abutment that may rise distally from the housing and at least partially enclose at least the at least one shelter and the distal portion of the at least one vent mechanism, (4) providing at least one fluid-exchange passageway within the at least one shelter allowing fluid exchange between the at least one sheltered area and the at least one abutment, (5) providing at least one base member, and (6) combining the at least one vent mechanism, the at least one shelter, the at least one area-enclosing abutment, the at least one fluid-exchange passageway, and the at least one base member to provide for gas-liquid separation and gas exchange for the housing.

DETAILED DESCRIPTION OF DRAWINGS

FIG. 1 illustrates an exploded view of elements of a fully assembled air-water separating air flow device 110 where fully assembled air-water separating air exchange device 110 is illustrated as a three-dimensional cut-away view of a fully assembled air-water separating air exchange device 110 and exploded element base member 160, vent mechanism 120, and shelter 130 are illustrated in full (non-cutaway) three-dimensional views. Base member 160 comprises annular abutment 140 and central tubular attachment mechanism 161, which comprises tubular through-opening 163 in which gas-exchange vent mechanism 120 comprising vent through-hole 121 may be inserted. Shelter 130, vent mechanism 120, and base member 160 with annular abutment 140 are assembled together into a singular unit to provide a cut-away view of fully assembled air-water separating air exchange device 110.

Figure 2:
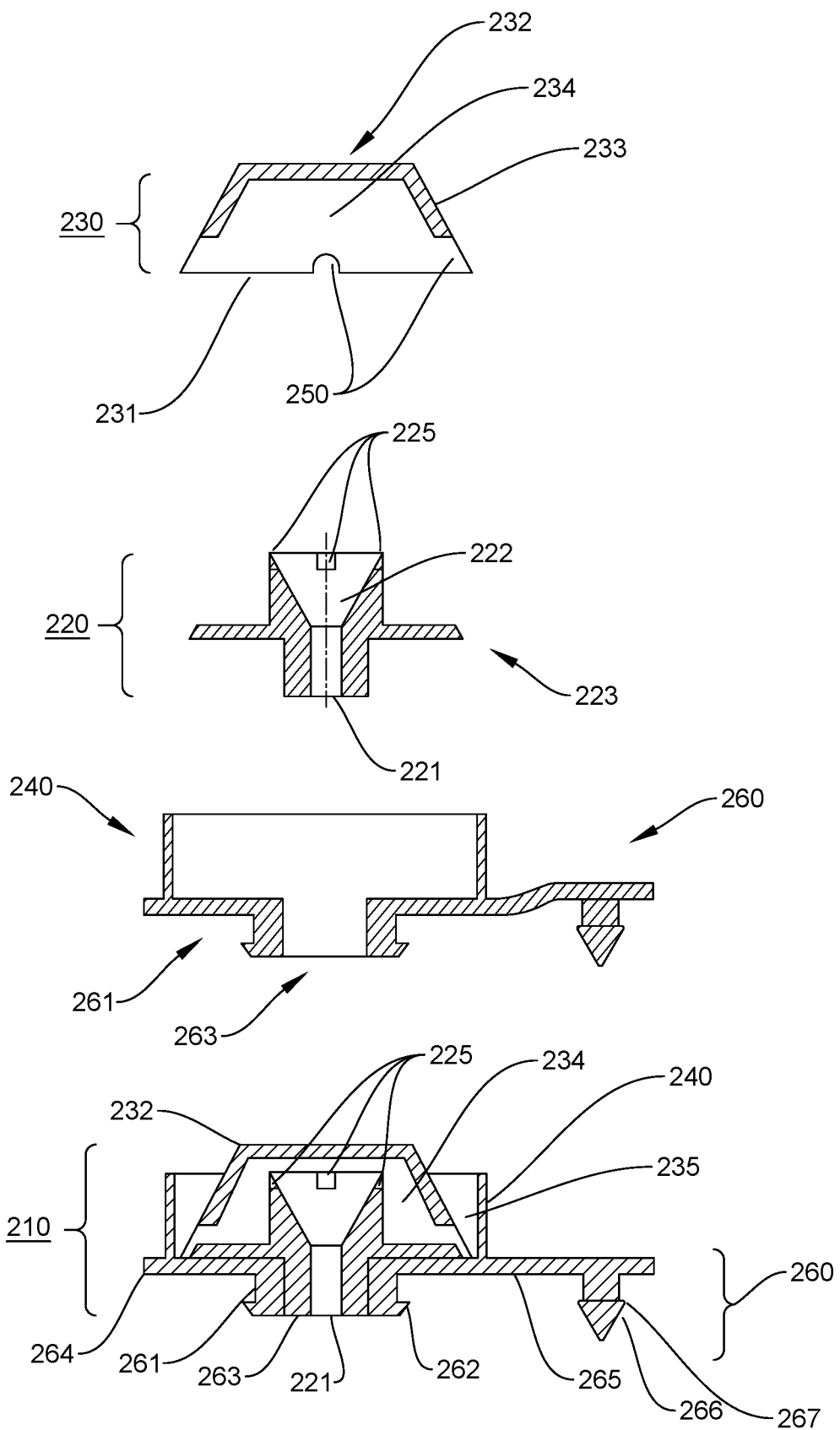
FIG. 2 illustrates a gas-liquid separating gas exchange device comprising a gas-exchange vent mechanism, a shelter sheltering the gas-exchange vent mechanism, an abutment encompassing both the shelter and the gas-exchange vent mechanism, fluid-exchange passageways, and a base member comprising a mechanism for attachment to a housing.

FIG. 2 illustrates an air-water separating air exchange device 210, which may comprise an air-exchange vent mechanism 220, a shelter 230, an annular abutment 240, four fluid-exchange passageways 250, and a base member 260.

The gas-exchange vent mechanism 220 may comprise a vent through-hole 221 extending distally through the base member 260 and becoming a conical vent flare 222 as it progresses distally from the base member 260. The distal portion of the conical vent flare 222 of the vent through-hole 221 may approach, border, adjoin, or touch the shelter covering 232 and may comprise four breathing apertures 225 arranged axially from the vent through-hole 221 at the adjoinment with the shelter covering 232.

The shelter 230 may comprise a shelter base 231 that approaches, borders, adjoins, or touches the base member 260. The shelter 230 extends distally from the shelter base 231 to the annular shelter covering 232 via annular shelter sidewalls 233 rising distally from the shelter base 231. The shelter 230 encloses a sheltered area 234 that shelters the gas-exchange vent mechanism 220 including the four breathing apertures 225 of the gas-exchange vent mechanism 220. The shelter 230 comprises four fluid-exchange passageways 250 that facilitate fluid-exchange between the sheltered area 234 and a fluid-catchment junction 235 at the juncture between the annular abutment 240 and the shelter sidewalls 233 at the base member 260.

The annular abutment 240 may rise distally from the base member 260 encircling the shelter 230 and the gas-exchange vent mechanism 220 and creating a fluid-catchment junction 235 at the juncture between the abutment 240 and the shelter sidewall 233 at the base member 260.

The four fluid-exchange passageways 250 may be equally interspersed axially within the shelter sidewalls 233 providing a passageway between the sheltered area 234 and the fluid-catchment junction 235 at the juncture between the annular abutment 240 and the shelter sidewalls 233 at the base member 260. The four fluid-exchange passageways 250 facilitate fluid-exchange between the sheltered area 234 and the fluid-catchment junction 235 at the juncture between the annular abutment 240 and the shelter sidewall 233 at the base member 260.

The base member 260 may comprise a central tubular attachment mechanism 261 comprising a resilient deformable annular attachment knurl 262 for insertion in (referring now to FIG. 9) caging tool opening 920 of air brake actuator housing 910 in air brake actuator 900. Central tubular attachment mechanism 261 comprises tubular through-opening 263 in which gas-exchange vent mechanism 220 comprising vent through-hole 221 is inserted. Base member 260 comprises annular flange area 264 for secure placement on (referring now to FIG. 9) air brake actuator housing 910 when central formed retention tubular attachment mechanism 261 is inserted in caging tool opening 920. Base member 260 further comprises extension arm 265 extending out from annular flange area 264 to provide secure attachment through attachment tubular stem 266 with resilient deformable annular stem attachment knurl 267 which is inserted in stem attachment receiving hole 925 in air brake actuator housing 910 in air brake actuator 900.

Figure 3:
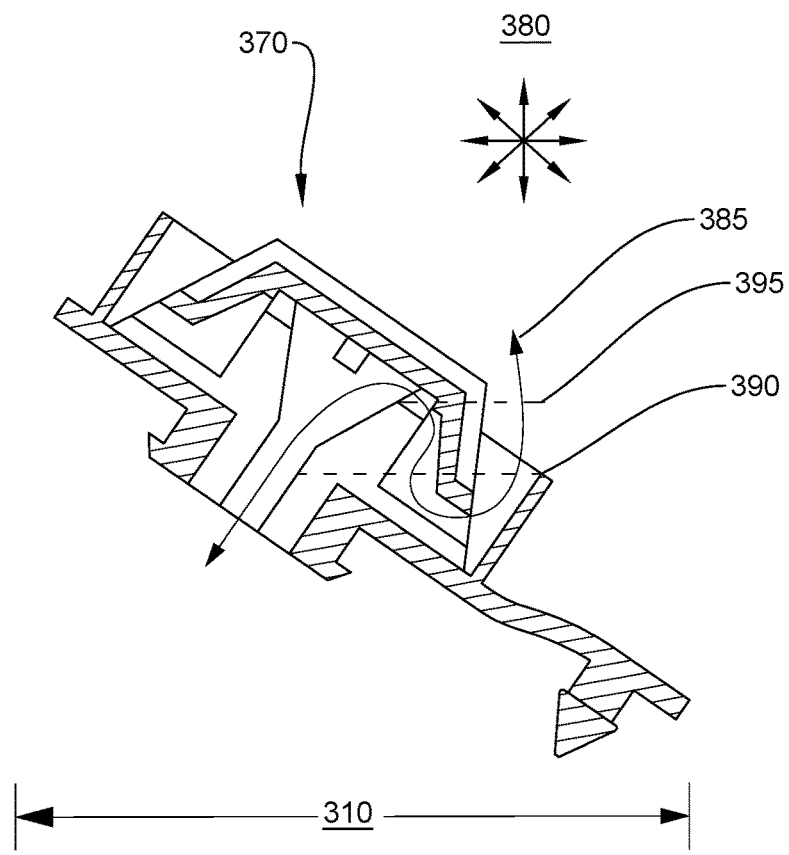
FIG. 3 illustrates a gas-liquid separating gas exchange device oriented at an angle to perpendicular to the force of gravity to supply gravitational force for separating gas from liquid and forcing the separated liquid away from a gas-exchange vent mechanism that allows gas exchange among the interior and exterior of a housing where vibrational and air-pressure forces may assist in the separation function.

FIG. 3 illustrates an air-water separating air exchange device 310, which may be oriented at an angle to perpendicular to the force of gravity 370 and subject to forces of vibration 380 while (referring now to FIG. 9) a brake actuator housing 910 is subject to motion from a moving vehicle on which a brake actuator 900 is installed and subject to air-pressure exchange air flow forces 385 upon usage of the brake actuator. The air-water separating air flow device may function in such an orientation in combination with such forces of vibration and air flow that, upon being subject to water, moisture, salt, and other liquids and debris from motion of the moving vehicle over wet and/or dirty and/or salted roadways, (referring now to FIG. 2) the venting mechanism 220 is protected from the water, moisture, salt, and other liquids and debris initially by the annular flexible abutment 240 and shelter 230. Where water and other liquids nevertheless enter sheltered area 234 within shelter 230, the water and other liquids predominantly migrate down with the force of gravity 370 to the lowest oriented fluid-exchange passageway 250 and collect in fluid-catchment junction 235. The force of gravity 370 in combination with the vibrational forces 380 and air-pressure exchange air flow 385 will move the water and other liquids and the moisture and debris carried in the water and other liquids over the flexible angled abutment 240 and out of the air-water separating air exchange device 310. Vibrational forces 380 and air-pressure exchange air flow 385 as applied to flexible abutment 240 result in micro-vibration and micro-sling forces to force water and other contaminants out of air exchange device 310. Further, because the air-water separating air exchange device 310 is oriented at a sufficient angle to the force of gravity 370 in combination with the forces of vibration 380 and air-pressure exchange air flow 385, the water and other liquids and the moisture and debris carried in the water and other liquids will collect in the fluid-catchment junction 235 and rise to migrate over the flexible angled abutment 240 and out of the air-water separating air exchange device 310 at the spill level 390 of the angled abutment 240 before the water and other liquids and the moisture and debris carried in the water and other liquids may rise to the intake level 395 of the lowest-oriented breathing aperture 225 at the distal end of the gas-exchange vent mechanism 220. This avoids overflow of the water and other liquids and the moisture and debris carried in the water and other liquids at intake level 395 through the lowest-oriented breathing aperture 225 into the vent mechanism 220 and the into the housing 910 (referring to FIG. 9) and likewise urges flow of the water and other liquids and the moisture and debris carried in the water and other liquids over abutment 240 and out of the air-water separating air exchange device 310 at spill level 390.

Referring now to FIG. 2 in view of FIG. 3, one example of a gas-liquid separating gas exchange device may provide flexible annular abutment 240 having a diameter to the outer edge of 1.900 inches. The diameter of the inner edge of annular abutment 240 may be 1.800 in. The thickness of flexible annular abutment 240 may be 0.05 in. The height of shelter 230 from the bottom of base member 260 to the top of the cap of the shelter may be 0.778 in. The height of the shelter 230 alone may be 0.522 or may be 0.502 in. The outside diameter of the cylinder of vent mechanism 220 may be 0.800 in. The inside diameter of the cone within the cylinder at the most distal portion of vent mechanism 220 may be 0.640 in. The diameter of the proximal end of the through-hole of vent mechanism 240 (the proximal end of the through-hole would be inside the housing when reversibly installed) may be 0.210 in. The height from the tip of attachment tubular stem 266 to the top of knurl 267 or in a non-limiting variation to the top of a resilient deformable attachment tip wedge of attachment tubular stem 266 may be 0.260. The diameter of the sealing surface of attachment tubular stem 266 may be 0.245 in. The height of the sealing surface of attachment tubular stem 266 may be 0.140. The smallest diameter of attachment tubular stem 266 in a non-limiting variation having an attachment tip wedge may be 0.200. The range for the widest part of the attachment tip wedge may be 0.319 to 0.325. The centerline of vent through-hole 221 to the center line of attachment tubular stem 266 may be 1.62 in.

Figure 4:
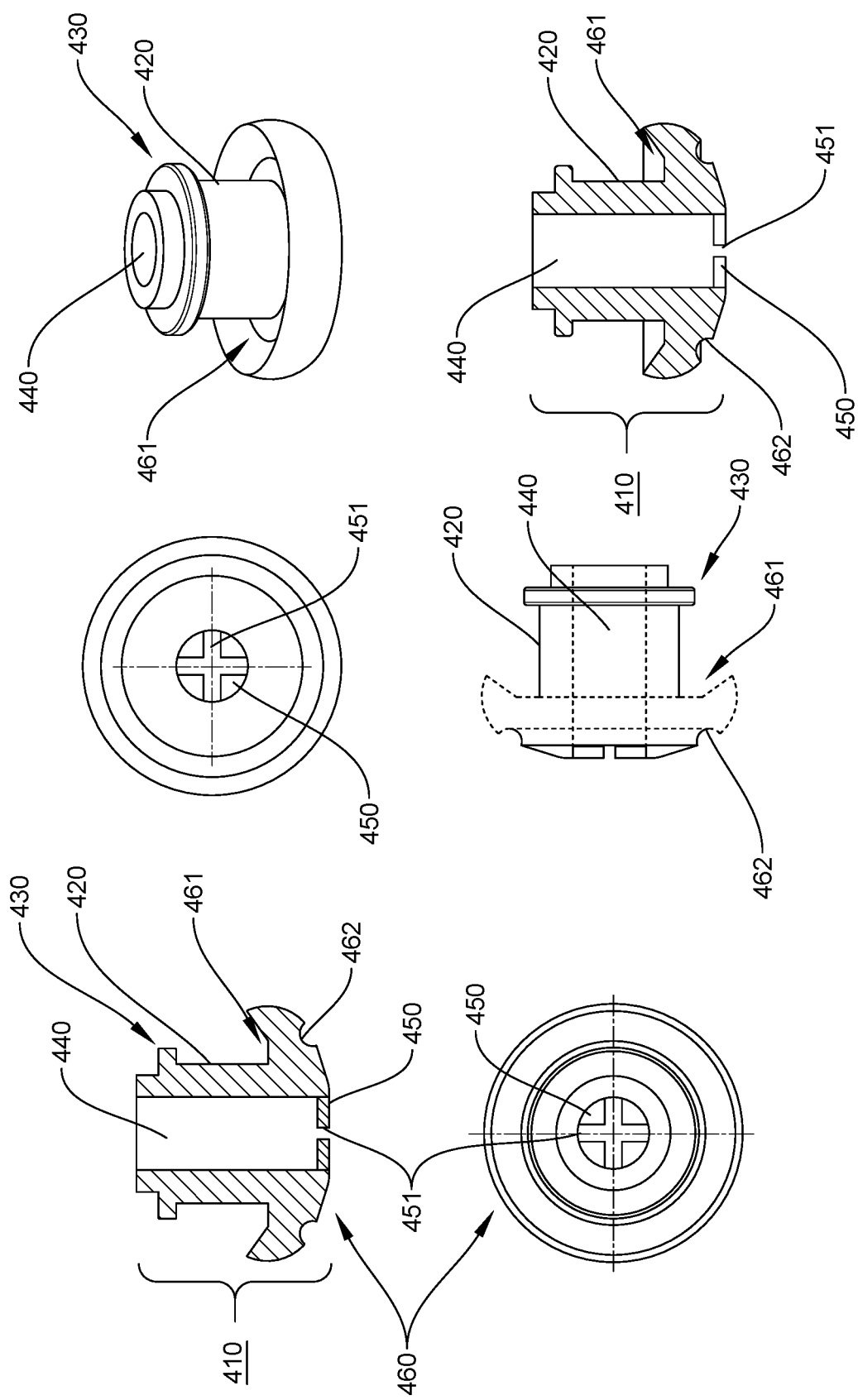
FIG. 4 illustrates a moisture-limiting and debris-limiting vent plug for limiting moisture and debris from entering through breather holes in a brake actuator housing. The vent plug comprises a cross-hatch vent through its cap.

FIG. 4 illustrates six views of a moisture-limiting and debris-limiting removable vent plug 410 for limiting moisture and debris from entering through breather holes in a brake actuator housing, which may comprise a tubular attachment mechanism 420 comprising a proximal resilient deformable annular knurl 430 for positive locking of the removable vent plug 410 inside the housing, a through-hole vent opening 440 with a distal breathing mechanism 450 comprising a flexible cross-hatch breathing aperture 451, and a domed elastomeric cap 460 with proximally-directed concave annular channeling 461 and distally-directed annular exterior groove 462 for flexible and removable sealing to the exterior of the brake housing comprising the flexible cross-hatch breathing aperture 451 distally capping the through-hole vent opening 440.

Figure 5:
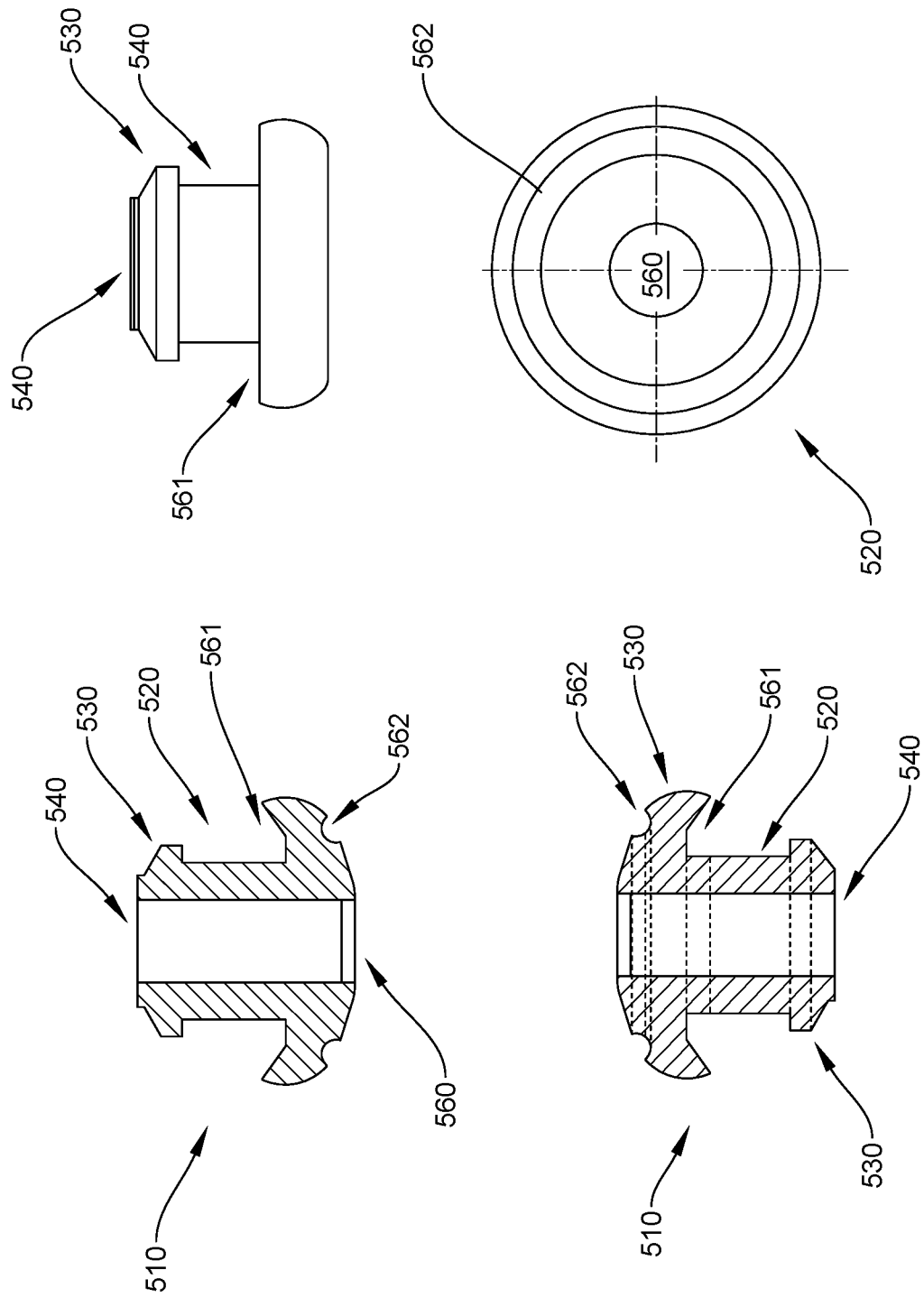
FIG. 5 illustrates a moisture-limiting and debris-limiting vent plug for limiting moisture and debris from entering through breather holes in a brake actuator housing. The vent plug comprises no internal venting mechanism. Under sufficient pressure, air may enter or exhaust around the plug and through the breather hole.

FIG. 5 illustrates four views of a moisture-limiting and debris-limiting removable vent plug 510 for limiting moisture and debris from entering through breather holes in a brake actuator housing, which may comprise a tubular attachment mechanism 520 comprising a proximal resilient deformable annular knurl 530 for positive locking of the removable vent plug 510 inside the housing and a domed elastomeric cap 560 with proximally-directed concave annular channeling 561 and distally-directed annular exterior groove 562 for flexible and removable sealing to the exterior of the brake housing distally capping the through-hole vent opening 540.

Figure 6A:
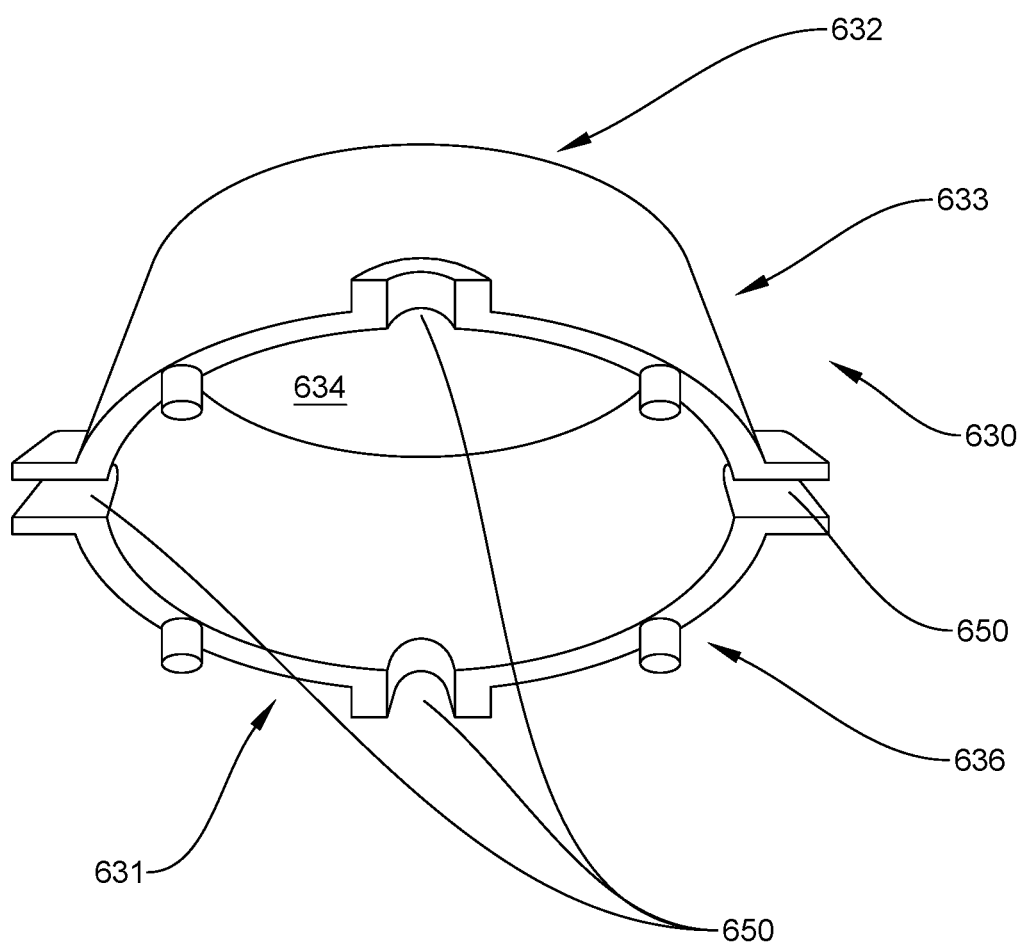
FIG. 6A illustrates a tilted side view of a shelter of a gas-liquid separating gas exchange device that may be to reflect a central hard-core element of a gas-liquid separating gas exchange device.
Figure 6B:
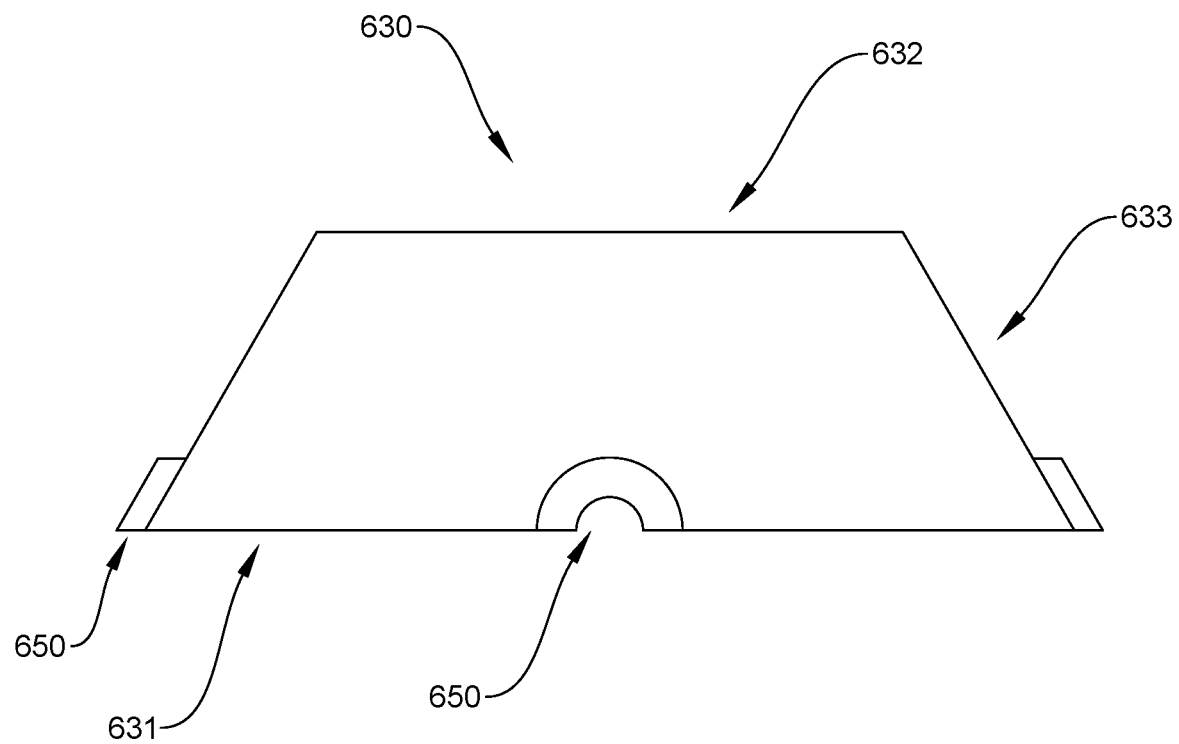
FIG. 6B illustrates a side view of a shelter of a gas-liquid separating gas exchange device that may be attached with a vent mechanism to reflect a central hard-core element of a gas-liquid separating gas exchange device.
Figure 6C:
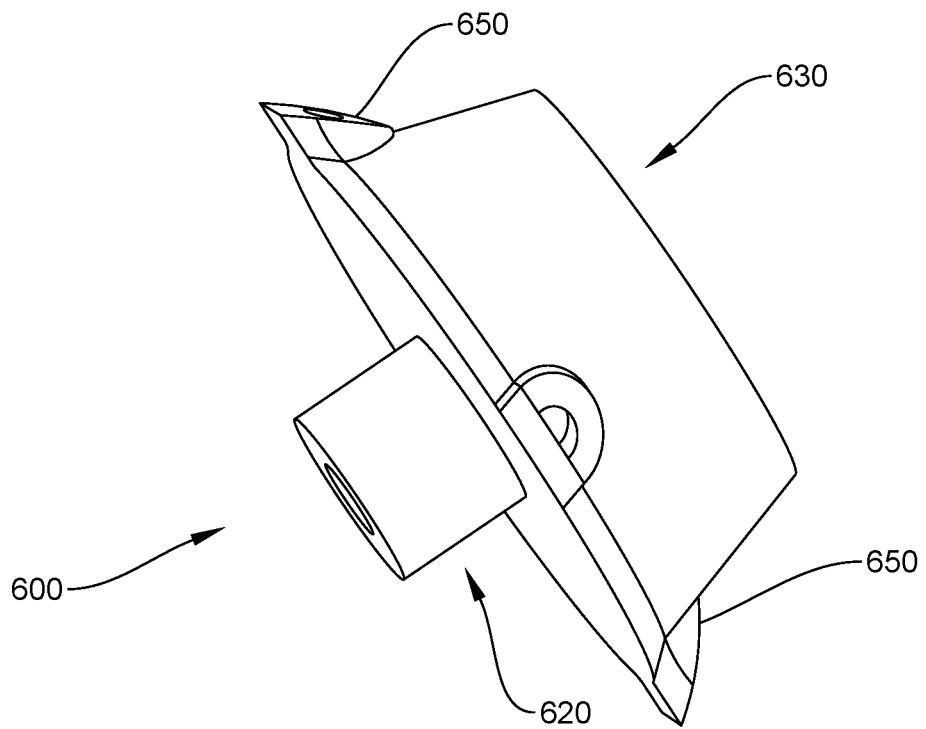
FIG. 6C illustrates a tilted side view of a central hard-core element of a gas-liquid separating gas exchange device reflecting a shelter of a gas-liquid separating gas exchange device attached with a vent mechanism.

FIGS. 6A-C illustrate three views of shelter 630 of an air-water separating air exchange device 210 of FIG. 2. The shelter 630 may comprise a shelter base 631 that borders, adjoins, or touches a base member 260 (referring now to FIG. 2). The shelter 630 extends distally from the shelter base 631 to the annular shelter covering 632 via annular shelter sidewalls 633 rising distally from the shelter base 631. The shelter 630 encloses a sheltered area 634 that shelters (referring now to FIG. 2) the gas-exchange vent mechanism 220 including the four breathing apertures 225 of the gas-exchange vent mechanism 220. The shelter 630 comprises four fluid-exchange passageways 650 that facilitate fluid-exchange between the sheltered area 634 and (referring now to FIG. 2) a fluid-catchment junction 235 at the juncture between the annular abutment 240 and the shelter sidewalls 633 at the base member 260. The shelter may comprise attachment posts 636 that may allow attachment to tubular receiving holes (not shown) in (referring now to FIG. 2) the annular flange 223 of the vent mechanism. As shown in FIG. 6C, shelter 630 may be attached to vent mechanism 620 to create hard central core 600 of (referring now to FIG. 2) air-water separating air flow device 210. FIG. 6A provides a view on the underneath sheltered and protected side of shelter 630 under which may sit the distal end of gas-exchange vent mechanism 220 of FIG. 2 and herein provided element 620. The underneath sheltered and protected side of shelter 630 is distal to the housing that is being vented but sheltered proximally under shelter 630. FIG. 6B provides a side view of the shelter 630 revealing the annular walls of the shelter 633 and the fluid-exchange passageways 650.

Figure 7A:
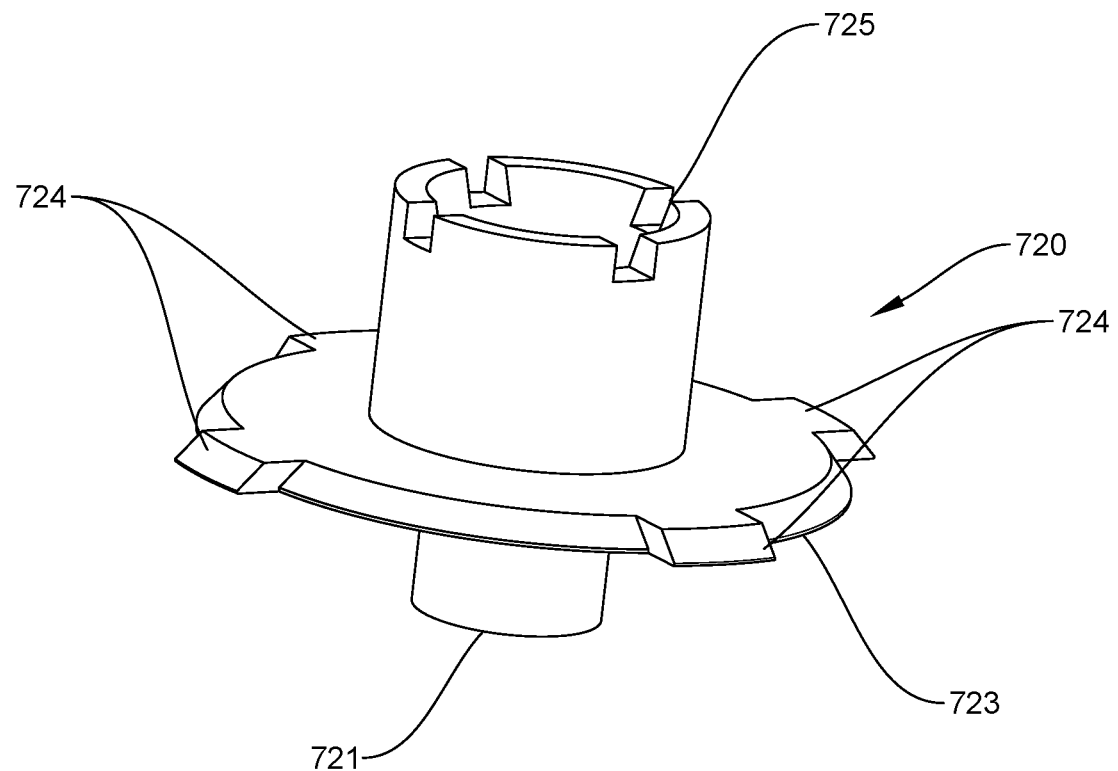
FIG. 7A illustrates a tilted side view of a vent mechanism of a gas-liquid separating gas exchange device with the distal portion of the vent mechanism oriented in the upward and rightward directions.
Figure 7B:
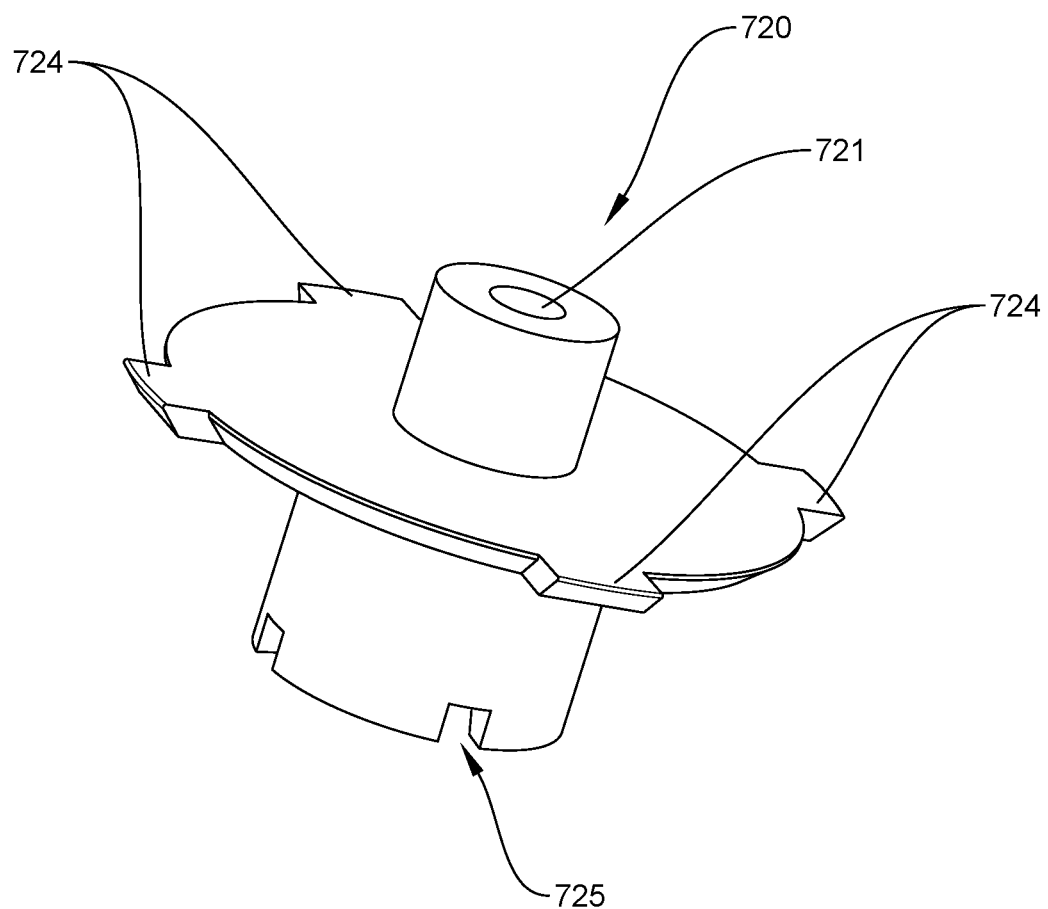
FIG. 7B illustrates a titled side view of a vent mechanism of a gas-liquid separating gas exchange device with the distal portion of the vent mechanism oriented in the downward and leftward directions.
Figure 7C:
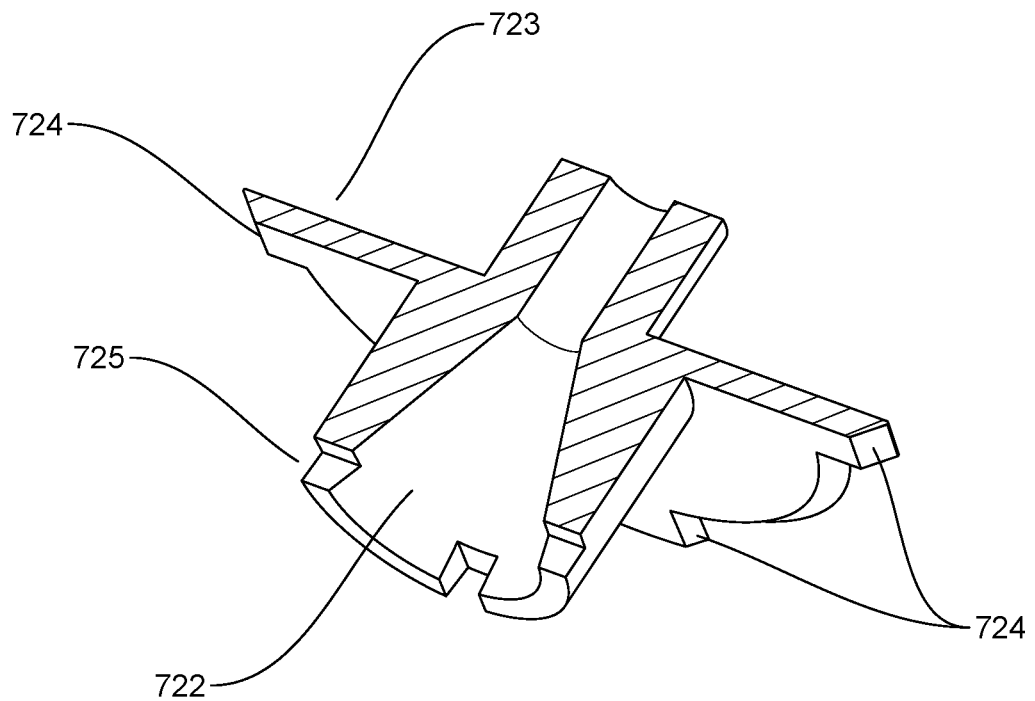
FIG. 7C illustrates a cut away of a half of a vent mechanism of a gas-liquid separating gas exchange device. The cut-away view exposes the vent hole and conical vent flare within the vent mechanism. In this view, the distal portion of the vent mechanism is oriented in the downward and leftward directions.

FIGS. 7A-C illustrate three views of a gas-exchange vent mechanism 720 within (referring now to FIG. 2) an air-water separating air flow device 210. The gas-exchange vent mechanism 720 may comprise a vent through-hole 721 extending distally through (referring now to FIG. 2) the base member 260 and becoming a conical vent flare 722 as it progresses distally from (referring now to FIG. 2) the base member 260. The distal portion of the conical vent flare 722 of the vent through-hole 721 may border, adjoin, approach, or touch (referring now to FIG. 2) the shelter covering 232 and may comprise four breathing apertures 725 arranged axially from the vent through-hole 721 at the adjoinment with the shelter covering 230. Gas-exchange vent mechanism 720 may comprise annular flange 723 which may comprise tabs 724. FIG. 7A provides a side view of the gas-exchange vent mechanism 720 wherein the portion of the vent through-hole that is proximal to a housing that is being vented by the gas-exchange vent mechanism is downward and to the left and the portion of the vent through-hole that is distal to a housing that is being vented by the gas-exchange vent mechanism beneath (referring now to FIG. 2) the shelter 230 is upward and to the right. FIG. 7B provides a side view of the gas-exchange vent mechanism 720 wherein the portion of the vent through-hole that is distal to a housing that is being vented by the gas-exchange vent mechanism is downward and to the left and the portion of the vent through-hole that is proximal to a housing that is being vented by the gas-exchange vent mechanism is upward and to the right. FIG. 7C is a cut-away of the gas-exchange vent mechanism 720 in a similar orientation to FIG. 7B. FIG. 7C demonstrates a vent through-hole 721 extending distally through (referring now to FIG. 2) base member 260 and becoming a conical vent flare 722 as it progresses distally from (referring now to FIG. 2) the base member 260.

Figure 8:
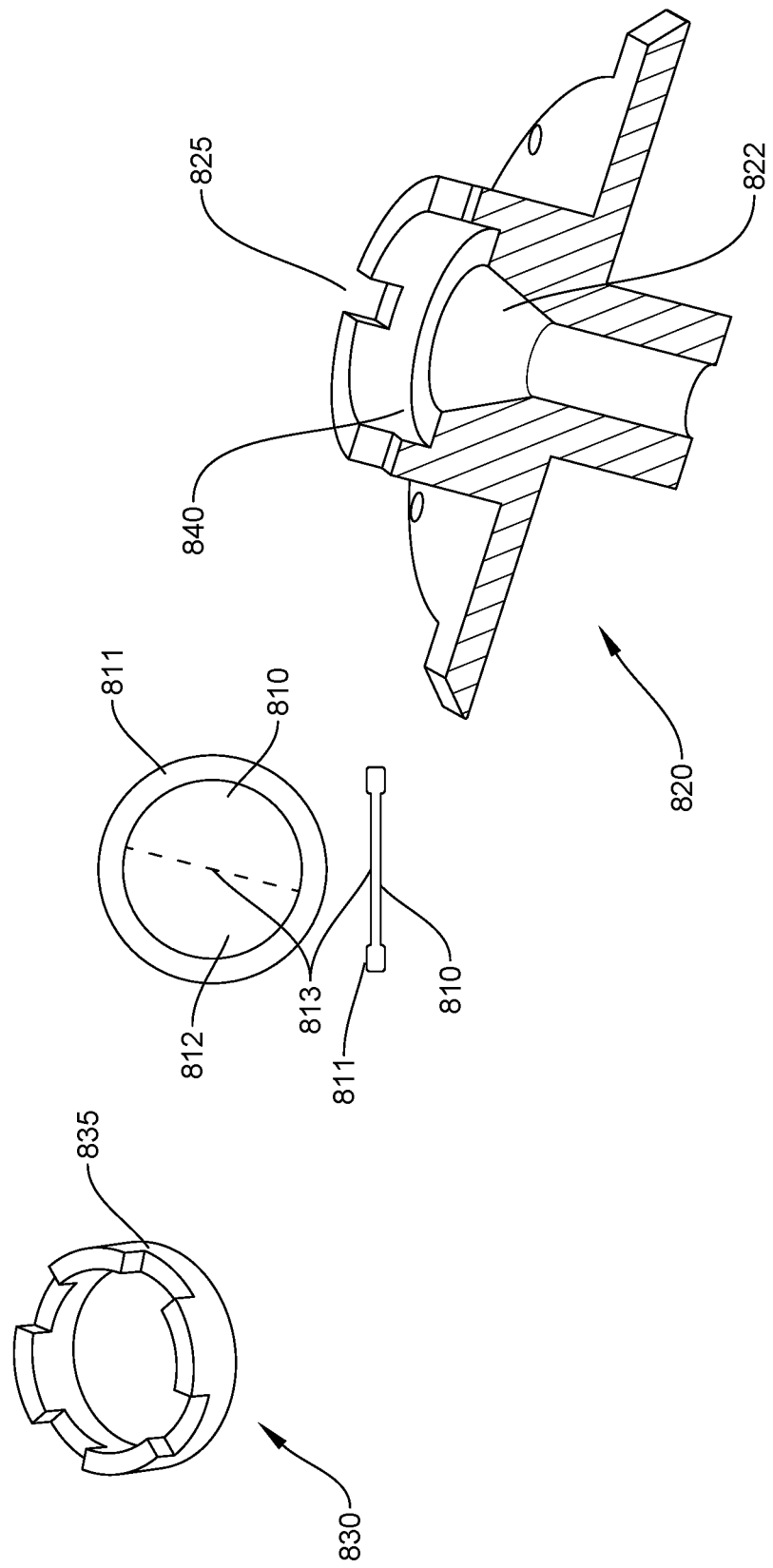
FIG. 8 illustrates a resilient deformable internal slit two-way venting valve that may be included within the vent mechanism of a gas-liquid separating gas exchange device and a castle element for fixing the two-way venting valve within a vent through-hole of a venting mechanism of a gas-liquid separating gas exchange device.

FIG. 8 illustrates a rubberized internal slit two-way valve 810 that may be included within vent mechanism 820. The rubberized internal slit two-way valve 810 may be held in place within the vent mechanism 820 by a castle housing 830. The castle housing 830 may comprise four equally-axially spaced breathing apertures 835 that are larger than but correspond spatially on-center to the four equally-axially spaced breathing apertures 825 of the vent mechanism 820. The rubberized internal slit two-way valve 810 may comprise an outer structural O-ring 811 of relatively stiffer material and may comprise an inner rubberized flexible material bed 812 of relatively softer material comprising a slit two-way valve 813 longitudinally through the middle of the flexible bed. To incorporate the rubberized internal slit two-way valve 810 and the castle housing 830 the gas-exchange vent mechanism 820 may be modified as compared to vent mechanism 220 of FIG. 2 to reduce the distal extension of the conical vent flare 822 from the base member 260 to provide a seat 840 at the distal extent of the conical vent flare 822 upon which the castle housing 830 may sit. The rubberized internal slit two-way valve 810 may be squeezed between and held in place by the seated castle housing 830 and the seat 840 whereby airflow may be allowed as exhaust and intake from the (now referring to FIG. 9) the housing 910 through the slit two-way valve 813.

Referring now to FIG. 8, one example of a gas-liquid separating gas exchange device may provide a castle housing 830 that is 0.6 in. in outside diameter, 0.19 in. in height (distally), and 0.06 in. thick (axially) with four equally-axial spaced breathing apertures 835 that are 0.19 in. across, 0.1 in. high, and 0.06 in. deep leaving four elevated castle housing walls of 0.24 in. each along the circumference of the castle housing. The rubberized internal slit two-way valve 810 may comprise an outer structural O-ring 811 of relatively stiffer material having a thickness (distally) of 0.047 in. and a width (axially) of 0.06 in. and may comprise an inner rubberized flexible material bed 812 of relatively softer material having a thickness (distally) of 0.0236 in. and comprising a two-way slit valve 813 longitudinally through the middle of the rubberized flexible material bed. To incorporate the rubberized internal slit two-way valve 810 and the castle housing 830, the gas-exchange vent mechanism 820 may be modified as compared to vent mechanism 220 of FIG. 2 to reduce the distal extension of the conical vent flare 822 by 0.19 in. leaving a 0.06 in. seat 840 at the distal extent of the conical vent flare 822 upon which the castle housing 830 may sit. The rubberized internal slit two-way valve 810 may be squeezed between and held in place by the seated castle housing 830 and the seat 840.

Figure 9:
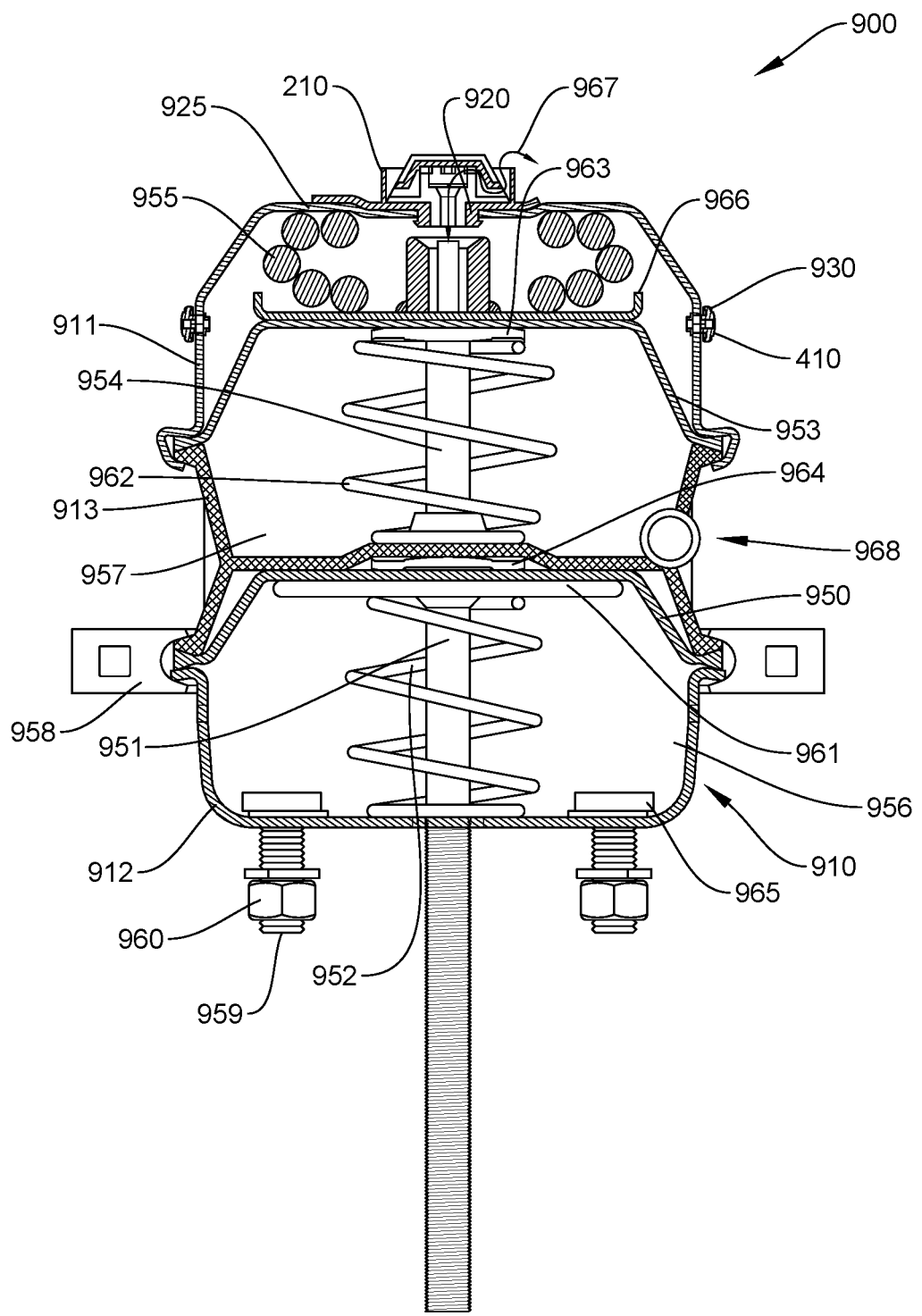
FIG. 9 illustrates an air brake actuator comprising an air-water separating air exchange plug device reversibly inserted at the caging tool opening of the actuator and four equally-axially-spaced moisture-limiting and debris-limiting vent plugs reversibly inserted at four equally-axially-spaced breather holes in the actuator housing.

FIG. 9 illustrates an air brake actuator 900, which may comprise an air-water separating air exchange device plug 210 at the caging tool opening 920 of actuator 900 and four moisture-limiting and debris-limiting vent plugs 410 (referring also to FIG. 4) inserted at four equally-spaced breather holes 930 in actuator housing 910. Air brake actuator 900 may comprise a housing 910, a service diaphragm 950, a service pushrod 951, a service spring 952, a parking diaphragm 953, a parking push-rod 954, a parking spring 955, a caging tool opening 920 and an air-water separating air exchange device plug 210.

Housing 910 may enclose a service brake chamber 956 and a parking brake chamber 957 and may comprise an upper housing 911, a lower housing 912, and a central adapter housing 913. Housing 910 may be held together by clamp 958. Mounting bolts 959 may extend for mounting actuator 900 within a vehicle. Nuts 960 may secure bolts 959 with boltheads 965. Housing 910 may incorporate a holder for a caging tool 968.

Service diaphragm 950 is provided to urge service pushrod 954 outward from actuator 900 in response to fluid pressure in order to cause application of the vehicle brakes. Fluid pressure may be introduced through a service port (not shown) in housing 910 to service chamber 956 on one side of diaphragm 950 opposite the side on which service pushrod 951 is disposed. Introduction of fluid pressure to service chamber 956 urges service pushrod 951 to a service apply position.

Service pushrod 951 transfers forces generated in actuator 900 to the vehicle brakes in order to apply or release the brakes. Pushrod 951 may define a pressure plate 961, which provides a surface on one side configured to engage diaphragm 950 and a surface on the opposite side configured to act as a spring seat for service spring 952.

Service spring 952 is provided to bias service pushrod 951 to a service release position. Service spring 952 is disposed within service brake chamber 956 on one side of service diaphragm 950. Service spring 952 is disposed about service pushrod 951 and is seated between housing 910 and pressure plate 961 of pushrod 951.

Parking diaphragm 953 is provided to urge parking pushrod 954 in one direction away from the parking apply position and towards the parking release position in response to fluid pressure. Spring 962 assists in this biasing. Diaphragm 953 is disposed within parking brake chamber 957. Fluid pressure may be introduced to parking brake chamber 957 on one side of diaphragm 953 through a parking port (not shown) in housing 910. Introduction of fluid pressure to chamber 957 urges parking pushrod 954 to a parking release position against the force of parking spring 955.

Parking pushrod 954 is provided to cause selective movement of service diaphragm 950 and service pushrod 951 in order to apply a parking brake. Pushrod 954 may be axially aligned with service pushrod 951. Pushrod 954 extends from parking chamber 957 into service chamber 956. Pushrod 954 includes a pressure plate 963 at one longitudinal end configured to engage parking diaphragm 953 such that pushrod 954 is configured for movement with parking diaphragm 953. Pushrod 954 includes another pressure plate 964 at an opposite longitudinal end configured for selective engagement with service diaphragm 950.

Parking spring 955 is provided to bias parking pushrod 954 to a parking apply position (and thereby move service pushrod to a service apply position). Parking spring 955 is disposed within parking brake chamber 957 on one side of parking diaphragm 953. Pressure plate 966 is provided on the parking brake chamber 957 side of parking diaphragm 953. Pressure plate 966 assists in transferring energy from parking spring 955 to pushrod 954.

Caging tool opening 920 in actuator housing 910 of actuator 900 is provided for entry of a caging tool to cage parking spring 955 at installation or upon failure of an air brake. Reversibly removable air-water separating air exchange device plug 210 (referring also to FIG. 2) mitigates entry of moisture and debris through the caging tool opening by providing air-water separation and air exchange between the parking brake chamber 957 and the atmosphere exterior to brake chamber 957 in the housing 910 and allows air pressure air exchange and vibrational forces to urge contaminants within housing 910 and air-water separating air exchange device plug 210 outwards. Removable air-water separating air exchange device plug 210 provides air exchange with brake chamber 957 in a manner that minimizes dangerous high- and low-pressure environments in the brake chamber 957 that may result in brake failure. Air flow 967 is bidirectional through air-water separating air exchange device plug 210. Four moisture-limiting and debris-limiting vent plugs 410 inserted at four equally-axially-spaced breather holes 930 in the actuator housing 910 provide further safety as additional fail safes against the creation of a high- or low-pressure environment on either side of diaphragm 953 of brake chamber 957 or in service chamber 956 through the creation of a seal in brake chamber 957, which may, for example, create a dangerous vacuum during operation.

Figure 10:
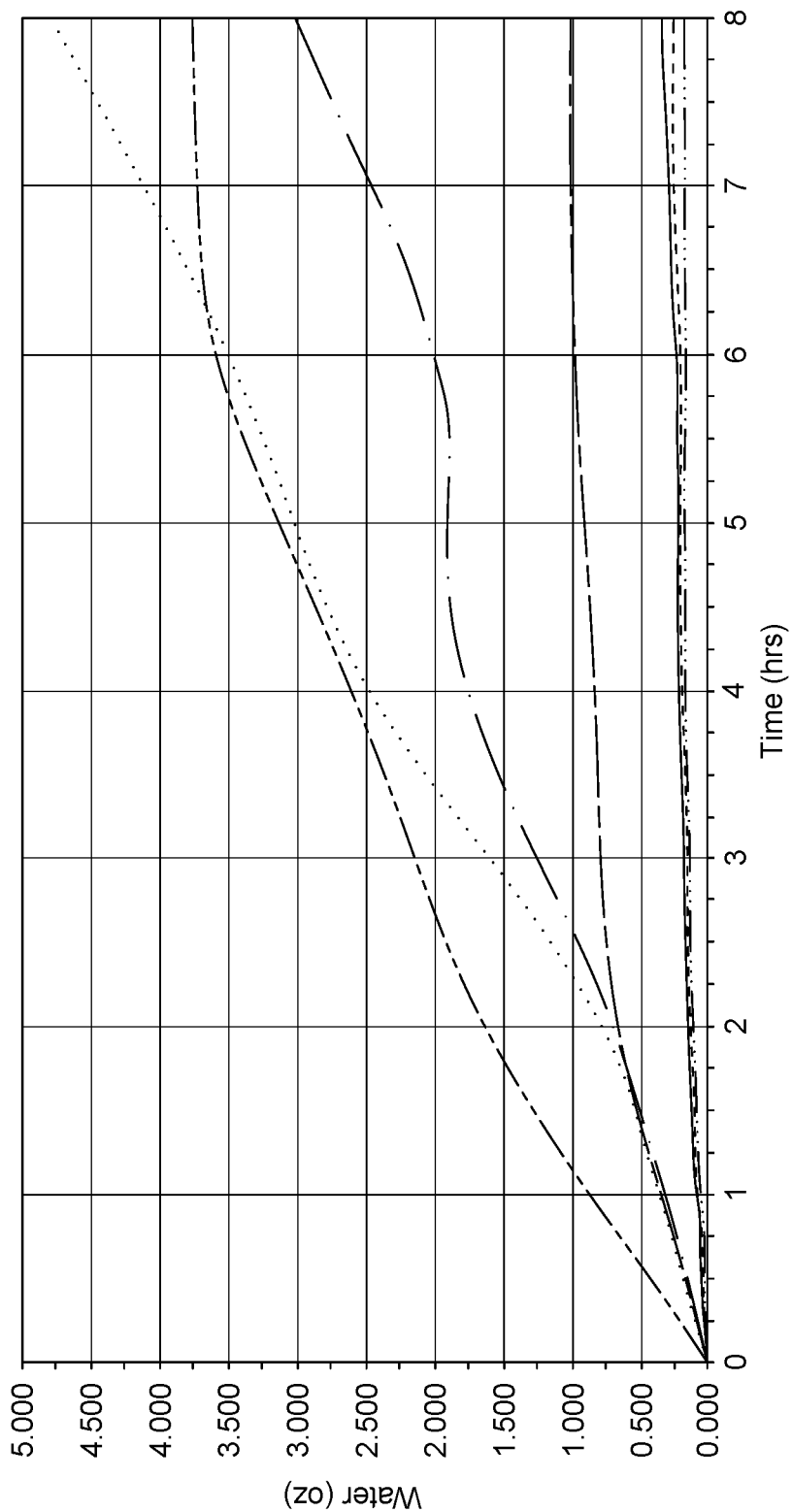
FIG. 10 illustrates a graph of data observed from a water spray accumulation test conducted comparing two embodiments of an air-water separating air exchange device according to the disclosure herein affixed to the caging tool opening in an air brake chamber to five state-of-the-art air brake chambers where each chamber was positioned at 45° from horizontal.

FIG. 10 illustrates a graph of data observed from a water spray accumulation test conducted comparing two standard aftermarket air brake chambers as non-limiting embodiments of the disclosure (affixed with air-water separating air exchange embodiments of the disclosure) to five state-of-the-art air brake chambers. The two standard aftermarket air brake chamber embodiments each comprised an air-water separating air exchange device plug embodiment affixed to the caging tool opening and an embodiment of four pressed-in vent hole plugs. The first aftermarket air brake chamber identified as Test CR 1 comprised an air-water separating air exchange device plug embodiment with an internal two-way slit valve comprised within its vent mechanism and four air water restricting breather hole plugs. The second aftermarket air brake chamber identified as Test CR 2 comprised an air-water separating air exchange device plug embodiment with no internal two-way slit valve within its vent mechanism and four air water restricting breather hole plugs.

The tested state-of-the-art air brake chambers included: (1) Test SA 1, a standard 30 square inch aftermarket chamber with standard dust plug at caging tool hole and no restrictions at the four breather holes; (2) Test SA 2, a standard 24 square inch OEM chamber with standard dust plug at the caging tool hole and no restrictions at the four breather holes; (3) Test SA 3, a standard 30 square inch OEM chamber with standard elongated tab dust plug and no restrictions at the four breather holes; (4) Test SA 4, a standard 30 square inch OEM chamber with strap dust plug and no restrictions at the four breather holes; and (5) Test SA 5, a standard 30 square inch OEM chamber with small circular dust plug and no restrictions at the four breather holes.

Each chamber was positioned at 45° from horizontal and exposed to spray water spraying initially at around 70 psi with a flow rate of 21.4 gallons per hour and accelerated to approximately 55 mph using a fan. Water accumulation was measured by weight at 2-hour intervals over 8 hours. Water weight by oz. is graphed against time for each brake chamber.

Data observed for Test SA 1 are illustrated with a long-line two-dash line. Data observed for Test SA 2 are illustrated with a long-line dot line. Data observed for Test SA 3 are illustrated with a solid line. Data observed for Test SA 4 are illustrated with a dotted line. Data observed for Test SA 5 are illustrated with a long-line medium-dash. Data observed for Test CR 1 are illustrated with a short-dash line. Data observed for Test CR 2 are illustrated with a long-dash three-dots line.

Data are provided in Table 1.

Figure 11:
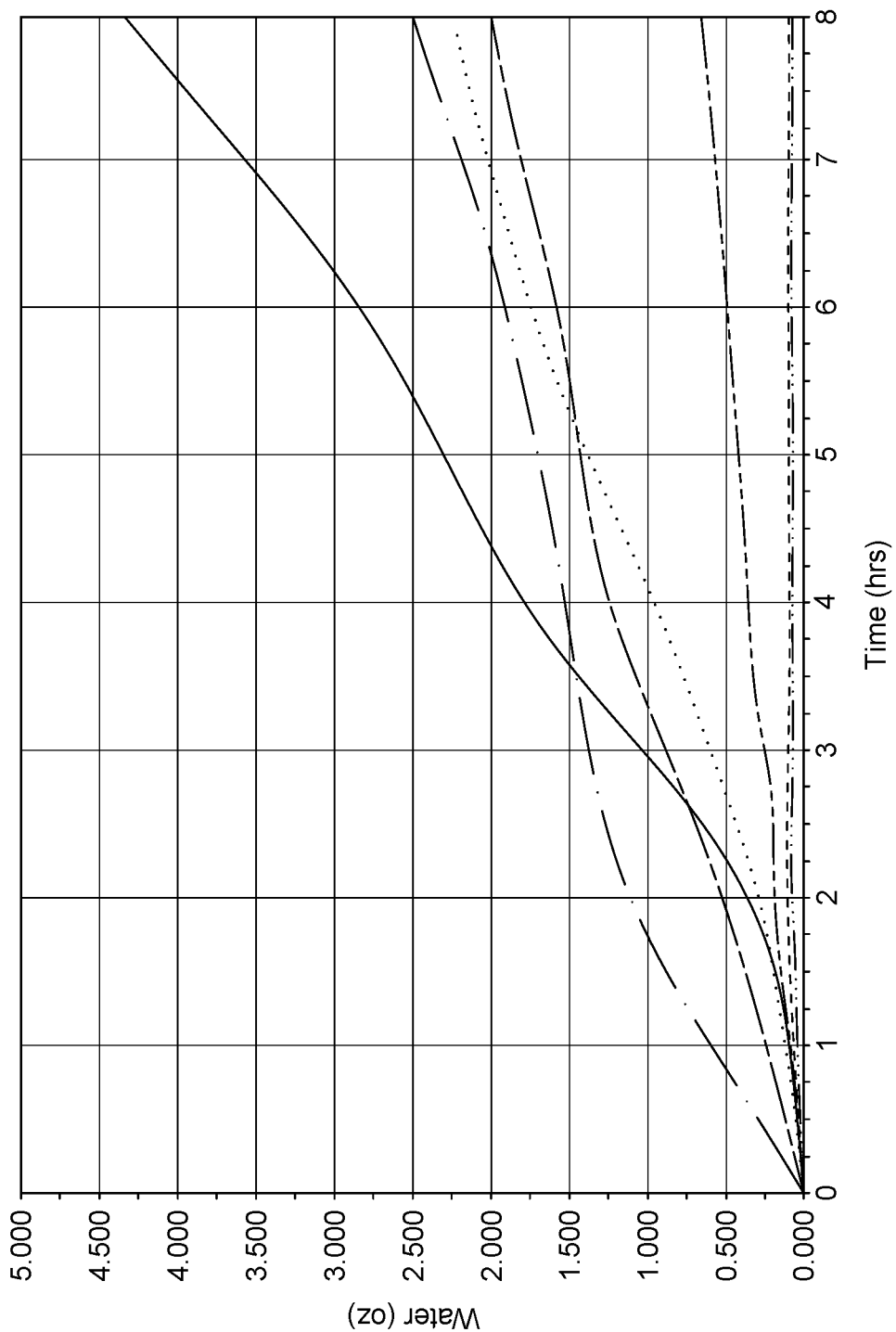
FIG. 11 illustrates a graph of data observed from a water spray accumulation test conducted comparing two embodiments of an air-water separating air exchange device according to the disclosure herein affixed to the caging tool opening in an air brake chamber to five state-of-the-art air brake chambers where each chamber was positioned at 75° from horizontal.

FIG. 11 illustrates a graph of data observed from a water spray accumulation test conducted comparing two standard aftermarket air brake chambers as non-limiting embodiments of the disclosure (affixed with air-water separating air exchange embodiments of the disclosure) to five state-of-the-art air brake chambers. The two standard aftermarket air brake chamber embodiments each comprised an air-water separating air exchange device plug embodiment affixed to the caging tool opening and an embodiment of four pressed-in vent hole plugs. The first aftermarket air brake chamber identified as Test CR 1 comprised an air-water separating air exchange device plug embodiment with an internal two-way slit valve comprised within its vent mechanism and four air water restricting breather hole plugs. The second aftermarket air brake chamber identified as Test CR 2 comprised an air-water separating air exchange device plug embodiment with no internal two-way slit valve within its vent mechanism and four air water restricting breather hole plugs.

The tested state-of-the-art air brake chambers included: (1) Test SA 1, a standard 30 square inch aftermarket chamber with standard dust plug at caging tool hole and no restrictions at the four breather holes; (2) Test SA 2, a standard 24 square inch (original equipment manufacturer) OEM chamber with standard dust plug at the caging tool hole and no restrictions at the four breather holes; (3) Test SA 3, a standard 30 square inch OEM chamber with standard elongated tab dust plug and no restrictions at the four breather holes; (4) Test SA 4, a standard 30 square inch OEM chamber with strap dust plug and no restrictions at the four breather holes; and (5) Test SA 5, a standard 30 square inch OEM chamber with small circular dust plug and no restrictions at the four breather holes.

Each chamber was positioned at 75° from horizontal and exposed to spray water spraying initially at around 70 psi with a flow rate of 21.4 gallons per hour and accelerated to approximately 55 mph using a fan. Water accumulation was measured by weight at 2-hour intervals over 8 hours. Water weight by oz. is graphed against time for each brake chamber.

Data observed for Test SA 1 are illustrated with a long-line two-dash line. Data observed for Test SA 2 are illustrated with a long-line dot line. Data observed for Test SA 3 are illustrated with a long-line medium-dash line. Data observed for Test SA 4 are illustrated with a dotted line. Data observed for Test SA 5 are illustrated with a solid line. Data observed for Test CR 1 are illustrated with a long-dash three-dots line. Data observed for Test CR 2 are illustrated with a short-dash line.

Data are provided in Table 2.

Figure 12:
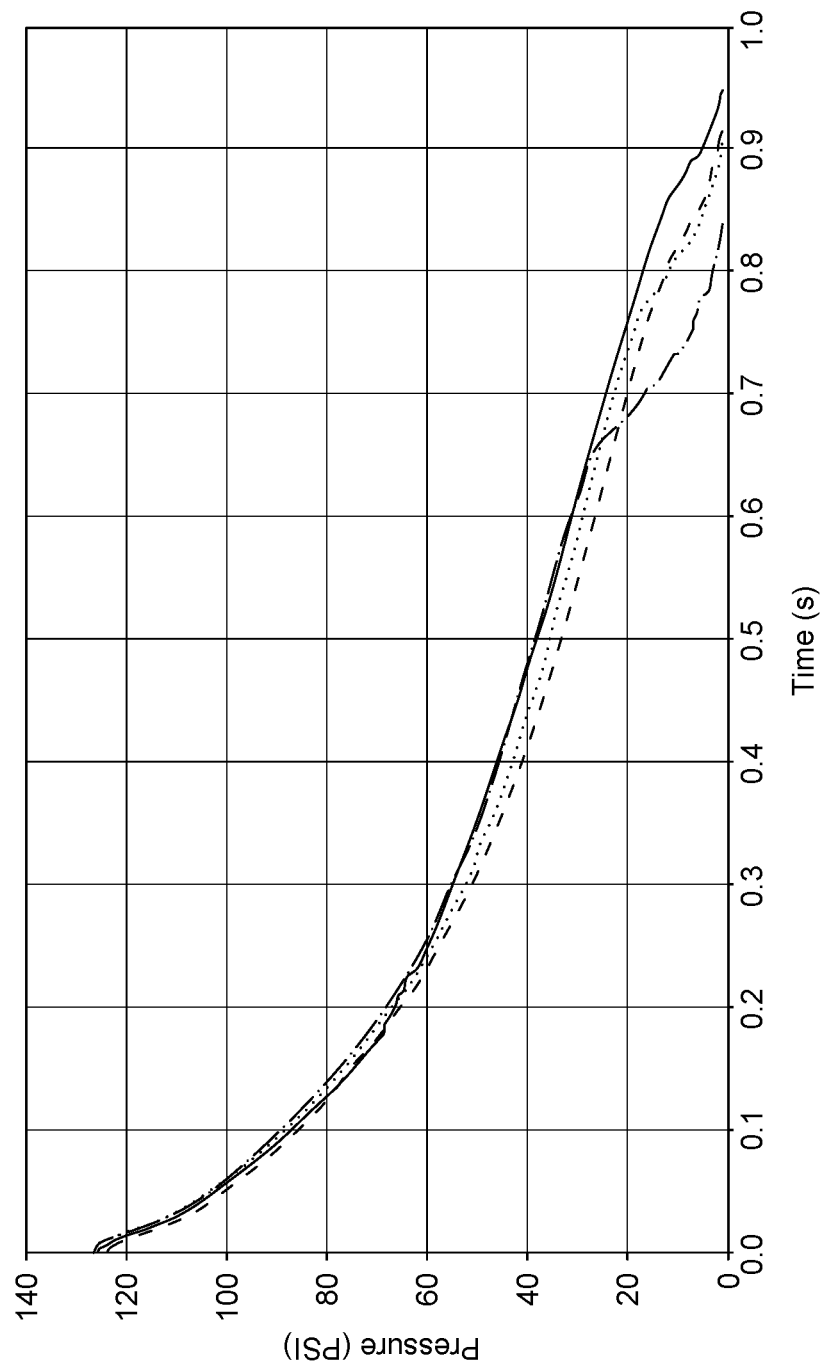
FIG. 12 illustrates an average of five repeated parking side pressure exhaust tests undertaken on a range of modified and unmodified commercially-available brake chambers and compared with an embodiment of a brake chamber affixed with an embodiment of an air-water separating air exchange device and an embodiment of four vent hole plugs according to the disclosure herein. The purpose of the test was to observe if the installation of an embodiment of an air-water separating air exchange device according to the disclosure did not negatively affect operation of the parking brake actuation by an appreciable amount as compared to commercially-available open brake chambers and if another state-of-the-art plug does negatively affect operation of the parking brake actuation by an appreciable amount as compared to a commercially-available open brake chamber. The test is to measure the pressure on the pressurized side of the parking brake chamber while the pressure is released, therefore engaging the parking brake.

FIG. 12 illustrates an average of five repeated parking side pressure exhaust tests undertaken on a range of modified and unmodified commercially available brake chambers compared with an embodiment of a brake chamber affixed with an embodiment of an air-water separating air exchange device plug and an embodiment of four vent hole plugs. The purpose of the test was to show that the installation of the air-water separating air exchange device plug embodiment unpredictably did not negatively affect operation of the parking brake actuation by an appreciable amount as compared to the commercial open brake chamber while a state-of-the-art one-way exhaust valve plug in the caging tool opening of a state-of-the-art OEM brake chamber appreciably negatively affected operation of parking brake actuation as compared to the commercial open brake chamber. The tests measured the pressure on the pressurized side of each parking brake chamber while the pressure was released to engage the parking brake.

One standard aftermarket brake chamber was tested where the standard dust plug for this aftermarket brake chamber was not reinserted into the caging tool hole (maintained open) and all four breather holes were maintained open for the test. The data for this open brake chamber are illustrated with a long-dash with single dot line. The same standard aftermarket brake chamber with caging tool hole and all breathing holes sealed with duct tape was tested. The data for this sealed brake chamber are illustrated with a short-dash line. One standard state-of-the-art OEM brake chamber with state-of-the-art one-way exhaust valve in the caging tool hole was tested. The data for this one-way brake chamber are illustrated with a light solid line. One standard aftermarket brake chamber was tested with a contaminant-resistant caging tool hole plug (air-liquid separating air exchange embodiment) and an embodiment of four pressed-in vent hole plugs. The data for this contaminant-resistant brake chamber embodiment are illustrated with a dotted line.

Gas-Liquid Separating Gas Exchange Device

One non-limiting aspect of the disclosure is a gas-liquid separating gas exchange device employing gravitational, vibrational, and/or gas pressure forces for mechanical separation of gas from liquid. Gas-liquid separating gas exchange devices have application across industries including, for example: transportation; aviation; chemical production, transportation, and storage; fossil fuels; pneumatic tools; and water management; among many others. A gas exchange device may comprise (1) at least one vent mechanism that services gas exchange for at least one housed environment, (2) at least one shelter of the vent mechanism distal from the housed environment that provides at least one sheltered area distal to the vent, (3) at least one at least partial area-enclosing abutment rising distally from the housed environment and at least partially enclosing at least the at least one shelter and the distal portion of the at least one vent mechanism, and (4) at least one fluid-exchange passageway within the at least one shelter allowing fluid exchange between the at least one sheltered area and the at least one abutment. The gas exchange device may comprise at least one base member providing at least one attachment device for attachment of the gas exchange device to a housing enclosing a housed environment and the attachment device may be designed to reversibly attach within an opening in the housing. The device may be removable. The device may be integrally constructed of resilient deformable material, such as resilient deformable polymer. The device may be constructed in whole or in part of resilient deformable materials such as rubber, plastic, polymers, polysiloxane, polyphosphazene, low-density or high-density polyethylene, polyvinyl chloride, polystyrene, nylon, Nylon 6, Nylon 6,6, polytetrafluoroethylene, thermoplastic polyurethanes, polypropylene, polystyrene (thermocole), polytetrafluoroethylene, polyvinyl chloride, polychlorotrifluoroethylene, and other resilient deformable materials.

The device may be constructed in whole or in part of hard plastic components, which may include and are not limited to polyhexamethylene adipamide, acrylonitrile butadiene styrene (ABS), polyactic acid (PLA), polyvinyl alcohol (PVA), polyethylene terephthalate (PET), polyethylene cotrimethylene terephthalate (PETT), high impact polystyrene (HIPS), polycarbonate (PC), polymethyl methacrylate, nylon, Nylon 6, Nylon 6,6, and polyoxymethylene. The device may be constructed in part from metal. The attachment device may be a threaded attachment device.

The device may be constructed from parts or molded as a whole. The device may be constructed from the combination of a vent mechanism, a shelter, an area-enclosing abutment, and a base member.

The vent mechanism and shelter may be constructed of hard plastic components such as Nylon 6,6. The area-enclosing abutment and base member may be constructed of resilient deformable material such as injection molded PVC. The area-enclosing abutment and base member may be constructed of injection molded PVC molded around Nylon 6,6-constructed vent mechanism and shelter components. The vent mechanism and shelter may be constructed from metal.

The device employs gravitational forces, vibrational forces, air-pressure forces, and/or combinations thereof to separate gas from liquid while allowing gas to exchange across a protected and sheltered vent that provides gas exchange between the exterior and interior of a housed environment and provides self-cleaning of housing and device contaminants. A mechanism of separation of gas and liquid employs one or more external encompassing abutments, which encompass and protect one or more shelters, which encompass and protect one or more vent through-holes, where the through-holes are closely protected by the one or more shelters and are elevated above the housing of the housed environment such that liquid may exit the device before rising or otherwise being shaken to the level of the vent through-holes. A junction of the one or more external encompassing abutments and the one or more vent shelters provides one or more fluid-catchment junctions and one or more fluid-exchange passageways are provided between the one or more external encompassing abutments and the one or more vent shelters such that fluid and debris collected within said one or more vent shelters may pass by gravitational, vibrational, and/or air-pressure forces into the one or more fluid-catchment junctions between the one or more external encompassing abutments and the one or more vent shelters before the fluid and debris may rise or be shaken or urged by air-pressure forces to the level of the one or more vent through-holes through which gas is exchanged between the interior and exterior of a housed environment. A flexible abutment may assist in expelling fluid and debris out, over, and away from the device via micro-slinging and micro-vibrational motion.

Geometric Shape and Applied Materials of Gas-Liquid Separating Gas Exchange Device Restrict Inward Movement of External Contaminants while Urging Expulsion of Internal Contaminants The interacting geometric shapes and applied materials of the various components of the device restrict movement of external fluid and debris inward toward the interior of the housing and at the same time urge expulsion of contaminants that otherwise may enter the device and/or the housing. In particular, the interacting geometric shapes and materials of the various components of the device restrict movement of the fluid and debris across the abutment, restrict movement through the fluid-exchange passageways and into the shelter, restrict movement up into the breathing apertures, and restrict movement through the vent mechanism and into the housing. At the same time during mechanical usage (such as during engine, vehicle, or brake usage, or combinations thereof), the interacting geometric shapes and materials of the various components of the device urge contaminants out of the housing and out of the device individually by gravitational, vibrational, and gas-pressure exchange forces as well as combinations of these forces. The device employs micro-slinging and micro-vibrational forces from machine and transportation vibrations and gas-pressure driven gas exchange to provide expulsion of liquid and dissolved and solid contaminants. The effect of gravitational, vibrational, and air-pressure forces provides a self-cleaning mechanism for fluid and particulate contaminants that may have entered within the geometrical shape of the device as well as contaminants that may be present in the housing. The interior surfaces of the device may exhibit surface characteristic that are slick and non-adhering with self-cleaning and easy-release properties. These properties allow forces to urge easy flow of liquids and debris through the geometric shapes and along the material surfaces of the device. As a result, machine vibration, traveling vibration, air pressure exchanges, gravitational forces, and/or combinations thereof urge self-cleaning of the housing and the gas exchange device and expel contaminants during usage. The art has conceived of no such device and the gas-liquid separating effect of the disclosed device in combination with the self-cleaning mechanism of the device and the avoidance of dangerous mechanism that clog during use provide an unpredictable and surprisingly significant advance in technology over previous designs which could not separate gas from liquid while allowing gas to exchange freely and without failure prone restrictive devices into and out of a housing, could not self-clean, and could not provide free-flow of gas into and out of the housing while significantly limiting the chance of the creation of vacuum within the housing.

In a non-limiting embodiment, pressure into the housing during pressure changes (such as brake application) that would otherwise urge foreign liquid and debris into the housing is resisted by the interior multi-geometrical definite shape of the device including resistance at the abutment, resistance at the fluid-catchment junction, resistance at the fluid-exchange passage way, resistance within the shelter, and resistance at the multiple elevated and angular breathing apertures. In a non-limiting embodiment, pressure out of the housing (such as brake release) allows expulsion of contaminants through the multi-geometrical definite shape of the device where contaminants easily move out of the housing, through the shelter, and over and out of the abutment along slick, non-adhering, smooth, and rounded internal surfaces that facilitate laminar fluid flow.

In a non-limiting embodiment, normal use of a vehicle comprising a brake housing comprising a gas-liquid separating gas exchange device provides vehicle vibration and air-pressure exchange which transfers vibrational and air-pressure forces into the sheltered area of the device providing micro-slinging and micro-vibrational forces to move water, debris, and solutes away from the internal circumference surface of the vent mechanism while preventing clinging of debris to the slick surfaces and disallowing creep effect along the surfaces toward the breathing apertures as well as disallowing run down effect by slinging away debris from the entrance to the vent mechanism. Together these external forces, geometrical configurations, and internal surface characteristics allow expulsion of contaminants while resisting intake of moisture and debris and continuing to allow necessary, unrestricted, and safe gas exchange.

For example, the exterior abutment of the device may extend slightly less distally than the shelter. In another example, the exterior abutment of the device may extend slightly more distally than the shelter. When the exterior abutment is exceedingly short (less distal) compared to the shelter (more distal), moisture and debris from wind and air movement have excessive access to the fluid-exchange passageways and may unnecessarily enter the vent shelter thereby threatening the vent mechanism (and therefore the interior of the housing) with possible contamination. When the exterior abutment is excessively tall (more distal) compared to the shelter (less distal), the exterior abutment has a tendency to trap moisture, dust (microscopic particles), and debris within the abutment. These contaminants then may move through the fluid-exchange passageways into the shelter and threaten the vent mechanism and internal housing or may clog one or more of the fluid-exchange passageways. Further, as the height of the exterior abutment increases as compared to the height of the breathing apertures of the vent mechanism, the required angle from perpendicular to the force of gravity at which liquid overflows the abutment before backflowing into a breathing aperture is increased. In view of each of these technical considerations, the ratio of height (distal extension from the housing/base member) of the abutment to height (distal extension from the housing/base member) of the shelter is important to the functioning of the device.

Another important component of the device is the geometric configuration of the breathing apertures of the vent mechanism. As disclosed, the breathing apertures within the device may be distally extended from the base member and, as a result, closely protected by the cap of the shelter. The breathing apertures may be positioned against the cap of the shelter to provide maximum possible distance from the base member (which is where liquid and debris may collect) as well as maximum possible distance within the shelter from the fluid-exchange passageways (into which debris and liquid may enter with force from wind or air pressure exchange from brake usage or other forces). The breathing apertures may be constructed of right angles both in the horizontal and vertical dimensions from the housing/base member such that laminar flow is interrupted as fluid might otherwise be urged by forces to move up and over the edge of the breathing apertures. As a result of disruption of laminar flow, entry of fluid and microscopic and macroscopic debris into the breathing apertures is restricted. Concerning contamination that may become present within the housing, sufficient air-pressure forces from air pressure release during usage may overcome any disruption in laminar flow out of the vent mechanism and through the right-angled breathing apertures to provide sufficient force to expel contaminants from within the housing out into the sheltered space for further progression out of the device with the application of further gravitational, vibrational, and/or air pressure forces.

In addition, the geometric configuration of the device with respect to the height (distal extension from the housing/base member) of the breathing apertures of the vent mechanism as compared to the height of the opening of the fluid-exchange passageways is important to proper function. In particular, the longer the distance a contaminating fluid must travel upward to reach the breathing apertures after entering the shelter through the fluid passageways, the less opportunity exists for contaminating liquid to enter the breathing apertures. In contrast, the longer the distance a contaminating fluid may travel downward with the force of gravity along the outer surface of the vent mechanism, the higher likelihood the contaminating fluid will exit through the fluid-exchange passageway and encounter the abutment by which micro-slinging forces (and others) may eject the contaminating fluid from the device.

The geometric configuration of the device with respect to the rounded, smooth, and non-stick nature of interior surfaces is likewise important to its functioning. In particular, a cylindrical exterior surface of the vent mechanism within the shelter, a rounded nature of the shelter itself, a rounded nature of the half-tubular fluid-exchange passageways, and a rounded construction of the exterior abutment, each may contribute to laminar flow of contaminating liquid down and along the surfaces to urge contaminants out of the device. Likewise, a smooth and non-stick texture of the internal geometric construction of the device may encourage movement of contaminating liquids out of the device while movement of contaminating liquids and debris into the device may be discouraged by energy required to work against gravity and vibrational forces to overcome the abutment, enter the fluid-exchange passageway, and overcome the distance between the floor of the sheltered space and entrance to the breathing apertures all while encountering vibrational energy as well as air-pressure exchanges (e.g., upon brake application and disengagement). The internal construction of the device may likewise be constructed of anti-static materials to encourage easy flow and expulsion of contaminants.

The geometric configuration of the fluid-catchment junction is likewise helpful for function. In particular, an angled nature of the fluid-catchment junction between the exterior of the shelter walls and the abutment provides catchment of contaminating fluid outside of the shelter while encouraging exit and flow along the surface of the abutment and out of the device. In addition, vibrational forces may urge the fluid along the abutment as flexibility of the abutment increases distally from the fluid-catchment junction (where it is fixed at the junction to the shelter and the base member) through to the more freely-moving top of the flexible abutment.

The geometric configuration of the fluid-exchange passageways of the device is likewise helpful for function. A plurality of equally-axially-spaced fluid-exchange passageways may provide downwardly facing exit passageways for contaminants within a range of orientations of the device. For example, while a vehicle is in motion, a plurality of equally-axially-spaced fluid-exchange passageways may provide downward exit paths for contaminants as the vehicle changes orientation and as it vibrates. As another example, four equally-axially-spaced fluid-exchange passageways may provide a downward exit passageway in nearly all orientations of the device. If the device is oriented rotationally with passageways at 0, 90, 180, and 270 degrees, at least one passageway will always orient near the bottom of the device with respect to the force of gravity and any liquid will exit at least through the most downward facing device. If the device is oriented rotationally with passageways at 45, 135, 225, and 315 degrees, two passageways will be in the downward orientation to the force of gravity and two passageways will be in the upward orientation to the force of gravity thereby allowing drainage at least through the downward oriented passageways. With four equally-axially-spaced fluid-exchange passageways, the only orientation in which the device would not have a downwardly-oriented passageway would be in the orientation in which the device is oriented upside down and perfectly perpendicular to the force gravity. Even in this peculiar orientation, the device will continue to function properly in that liquid will be highly restricted from entering the shelter through the fluid exchange passageways and vibrational and air-exchange forces will continue to urge any contaminants out of and away from the vent mechanism. These vibrational and air-exchange forces will assist exit of contaminants and resist entry of contaminants in all possible orientations of the device. As a result, four equally-axially-spaced fluid-exchange passageways within the device will provide continual urging of contaminants out of the device, particularly during use (including during use in a brake actuator of a vehicle) because the orientation of the device will always be changing sufficiently by vibration and/or alterations in orientation to urge fluid to at least one of the fluid-exchange passageways and out of the device.

A critical feature of the device is the ability of the device during usage to urge contaminants away from the vent mechanism while continuing to consistently allow gases to exchange unimpeded and without mechanical interference through the vent mechanism and, therefore, into and out of the housing. This is distinguishable from techniques previously available in the art that rely solely on filtering and/or diaphragm valve mechanisms. Filtering mechanisms significantly resist exit of contaminants and are particularly prohibitive of self-cleaning. Filtering mechanisms likewise present a dangerous physical barrier to movement of air into and out of the housing and create the real possibility of clogging in which negative or positive pressure may occur resulting in possible catastrophic failure. This technical weakness is likewise present in mechanisms applying diaphragm valves as a sole form of housing protection. Diaphragm valves that restrict air exchange in one direction or another are subject to tearing or clogging, resulting in possible positive or negative pressure build up and in failure of moisture and contaminant resistance. Further, diaphragm valves that are a sole form of housing protection do not allow uninhibited free-flow of fluids, which restricts expulsion of contaminants. As understood by the skilled artisan, a filter or diaphragm valve may be used within a gas-liquid separating gas exchange device disclosed herein but use of such technology alone cannot reflect critical features of what is herein disclosed. Instead, a combination of the elements of the device provide protection for any filter or diaphragm valve positioned internally within the vent device at the vent through-hole. When a diaphragm valve or filter are placed within the vent device, the vent device provides long term protection to the filter or diaphragm from encountering otherwise high levels of moisture, debris, and solutes thereby protecting the functional life of the filter or diaphragm.

In particular, a diaphragm valve device placed within the vent through-hole benefits from the extensive inhibition of entry of external moisture and debris provided by the gas-liquid exchange device while maintaining the self-cleaning elements of the device. When the diaphragm valve is opened by air pressure to allow expulsion of air from the housing and through the diaphragm valve positioned within the vent through-hole, the pressurized and rapidly-moving air may expel contaminants out of the housing, through the diaphragm valve, into the sheltered space, through a fluid exchange passageway, over the area-enclosing abutment, and out of the gas-exchange device.

The pressurized and rapidly moving air moving through the gas-liquid exchange device is accelerated and concentrated by the reduction of the cross sectional area of the airflow passageway (Venturi effect) in the vent through-hole and through the breathing apertures ensuring that contaminates are moving rapidly enough to make it past any diaphragm or two-way restrictive valve. Once past the diaphragm or two-way valve, the air flow slows due to expanded air volume inside of the shelter device. Nonetheless, any contaminates released inside of the shelter will be pulled back into the air/water stream at the exit of the shelter through the fluid exchange passageways due to the reduction of the air flow cross sectional area (Venturi effect) at the fluid exchange passageways, thereby expelling contaminants out of the sheltered area, into the fluid-catchment junction, and over the abutment.

Repeated expulsion of air from the housing and through the diaphragm or two-way restrictive valve will provide further pressure that urges contaminants remaining within the gas-exchange device to migrate through the elements of the device and into the exterior atmosphere.

The gas-liquid separating gas exchange device may separate any gas and any liquid while allowing the gas to exchange between the interior and exterior of the housed environment and by expelling liquid and debris from the device and from the housing environment. The gas may be air and the liquid may be water, but as understood by one skilled in the art, the design is not limited to these elements. The gas may be the gaseous form of a volatile organic material and the liquid may be the liquid form of a volatile organic material. The gas may likewise be a mixture of an organic and an inorganic gas and the liquid may be a mixture of an organic and an inorganic liquid. The gas-liquid gas exchange device is applicable in any environment where gas exchange is necessary between the interior and exterior of a housed environment or with differing gas pressures across any barrier and a liquid may be separated from the gas before presentation of the gas to the exchange vent for the environment housing or across the barrier.

The device may be an air-water separating air exchange device plug for insertion in the caging tool opening in the air brake actuator.

The gas-liquid separating gas exchange device may comprise (1) at least one ventilation means for providing gas exchange for at least one housing, (2) at least one sheltering means for providing shelter of the at least one ventilation means, (3) at least one area-encompassing means rising distally from the housing and axially encompassing at least the at least one sheltering means and the at least one ventilation means, and (4) at least one fluid-exchange means allowing fluid exchange between the at least one sheltering means and the at least one area-enclosing means. The device may further comprise an attachment means, which may be a reversible attachment means. The ventilation means may comprise at least one flexible two-way venting valve.

In a non-limiting embodiment, the sheltering means provides a sheltered space comprising the ventilation means wherein liquid within said sheltered space may evacuate said sheltered space via the force of gravity or vibration or a combination of gravity and vibration and gases may exchange between the atmosphere outside of said gas-liquid separating gas exchange device and said sheltered space through said fluid exchange means and gases may further exchange from the sheltered space through said ventilation means all while contaminants are urged outwardly.

Air-Water Separating Air Exchange Device on an Air Brake Actuator

An air-water separating air exchange device may be part of an emergency air brake actuator housing comprising (1) at least one vent mechanism that services air exchange for at least one housing, (2) at least one shelter of the vent distal from the housing that provides at least one sheltered area distal to the vent, (3) at least one at least partial area-enclosing abutment rising distally from the housing and at least partially enclosing at least the at least one shelter and the distal portion of the at least one vent mechanism, (4) at least one fluid-exchange passageway within the at least one shelter allowing fluid exchange between the at least one sheltered area and the at least one abutment, and (5) at least one base member comprising at least one aperture for the at least one vent mechanism and at least one attachment device for attachment of the gas exchange device to the actuator housing. The at least one vent mechanism that services air exchange for at least one housing may comprise at least one flexible two-way venting valve. The air-water separating air exchange device may be a removable plug insertable in a caging tool opening in the air brake actuator housing. The device may be constructed at least in part of resilient deformable material for insertion and removal in the caging tool opening.

The actuator housing may additionally be vented, sealed, or partially sealed by one or more moisture-limiting and debris-limiting removable vent plugs for limiting moisture and debris from entering through breather holes in the brake actuator housing. These additional moisture-limiting and debris-limiting removable vent plugs may be comprised of a tubular attachment mechanism comprising a proximal resilient deformable annular knurl for positive locking of a removable vent plug inside the housing. They may comprise a domed elastomeric cap with proximally-directed concave annular channeling and a distally-directed annular exterior groove for flexible and removable sealing to the exterior of the brake housing. They may further comprise a through-hole vent opening with a distal breathing mechanism comprising a flexible cross-hatch breathing aperture. The domed elastomeric cap with proximally-directed concave annular channeling and distally-directed annular exterior groove for flexible and removable sealing to the exterior of the brake housing may comprise a flexible cross-hatch breathing aperture distally capping the through-hole vent opening.

The actuator housing may additionally comprise one or more moisture-limiting and debris-limiting removable plugs for limiting moisture and debris from entering through breather holes in the brake actuator housing. These plugs may be vented or non-vented. For non-vented plugs, the resilient deformable characteristics of the plugs may allow the plugs to deform slightly or more then slightly from the actuator housing upon high internal pressure (or be completely ejected from the actuator housing upon high shock pressure) thereby protecting the brake actuator from catastrophic failure upon accidental sealing and pressurization of the actuator housing.

Additional venting by one or more moisture-limiting and debris-limiting removable vent plugs for limiting moisture and debris from entering through breather holes in the brake actuator housing provides additional safeguards against the creation of dangerous negative or positive pressure within the brake actuator housing. In combination with an air-water separating air exchange device plug inserted at the caging tool opening of the actuator housing, the art is provided an elegant and superior mechanism for mitigating early main spring corrosion and failure and early pushrod friction failure without creating new risk of catastrophic over-the-road failure from inadvertent and inappropriate vacuum pressure in the actuator housing.

During normal use of a vehicle, the operational vibrational and air-exchange effects enhance self-cleaning of microscopic particles, such as dust, as well as liquids and debris generally, from the interior of the device through the geometric pathways of the device. The interior surfaces of the device may be slick, non-adhering, and self-cleaning with easy release properties and easy flow-through of water, oils, solvents, solutes, salts, and debris including microscopic and macroscopic particles. Vibrational effects transfer particularly to the shelter area, the fluid-catchment junction, and the area-enclosing abutment to prevent and resist water, debris, and solutes from entering the vent mechanism by (1) micro-slinging and micro-vibration of contaminants away from internal circumference surface of the vent mechanism, (2) preventing clinging of water, debris, and solutes to the interior surfaces, and (3) disallowing creep and run down effects by slinging and vibrating water and debris away and down from the breathing apertures of the vent mechanism while interrupting laminar flow at right angles (and otherwise sharp angles) at the fluid exchange passageways and breathing apertures. The interior geometrical definitive shape likewise facilitates expulsion of liquids, debris, and moisture during brake release, as air exits under pressure, and resists intake of liquids, debris, and moisture during brake application, as air enters under pressure.

In particular, micro-slinging and micro-vibration effects are enhanced by the somewhat flexible nature of the exterior encompassing abutment of the device. For example, the abutment may be constructed from injection molded PVC and may provide micro-vibrations and micro-slinging during normal vehicle use including machine and traveling vibrations as well as air exchange during and after braking.

Further, the geometric construction of the device may provide rounded geometrical shaping to allow laminar flow of liquids, such as water, and gases, such as air, out of the housing and through and out of the device. The geometric construction of the device may further provide serial barriers (including barriers to interrupt laminar flow) to intake of liquids and debris during braking use and vehicle motion that would otherwise become contaminants in the brake actuator.

Atmospheric Equilibrating Air Brake Actuator

An air pressure actuated spring brake system for heavy duty vehicles is provided. The spring brake system may comprise an air brake actuator with an air-water separating air exchange device plug at the caging tool opening of the actuator and one or more moisture-limiting and debris-limiting vent plugs inserted at one or more breather holes in the actuator housing. The number of vent plugs in breather holes may be one, two, three, four, five, six, seven, eight or more. The air brake actuator may include a housing, a service diaphragm, a service pushrod, a service spring, a parking diaphragm, a parking push-rod, a parking spring, a caging tool opening, a reversibly removable air-water separating air exchange device plug at the caging tool opening, and four moisture-limiting and debris-limiting vent plugs inserted at four equally-axially-spaced breather holes in the housing. The housing may enclose a service brake chamber and a parking brake chamber and may comprise an upper housing, a lower housing, and a central adapter housing. The housing may be held together by clamps. Mounting bolts may extend from the housing for mounting the actuator within a vehicle.

A caging tool opening in the actuator housing may be provided for entry of a caging tool to cage the parking spring before installation or upon failure of an air brake. The removable air-water separating air exchange device plug may mitigate entry of moisture and debris through the caging tool opening by providing air-water separation and air exchange between the parking brake chamber and the atmosphere exterior to the brake chamber in the housing. The removable air-water separating air exchange device plug may provide air exchange with the brake chamber in a manner that minimizes dangerous low- and high-pressure vacuum environments in the brake chamber that may result in brake failure. The removable air-water separating air exchange device plug likewise may urge liquids, debris, and moisture out of the brake chamber and the device itself from slinging vibrational forces and exiting air pressure during brake release. The four moisture-limiting and debris-limiting vent plugs inserted at the four breather holes in the actuator housing may provide further safety as additional fail safes against the creation of a high- or low-pressure environment on either side of the brake chamber diaphragm or in the service chamber through the creation of an unintended seal in the brake chamber, which may, for example, create a dangerous vacuum during operation resulting in catastrophic failure. The four moisture-limiting and debris-limiting vent plugs inserted at the four breather holes in the actuator housing likewise may provide further self-cleaning exits for liquid, debris, and moisture exiting the housing as vibrational and air-pressure forces are applied. May be glued with cyanoacrylate adhesive or other glue or epoxy into the breather holes.

Under wet weather conditions, some moisture may enter a spring brake actuator comprising a liquid-air separating air exchange plug at the caging tool opening as well as multiple moisture-limiting and debris-limiting vent plugs. In general, applicant has shown that virtually all of this moisture enters through the multiple moisture-limiting and debris-limiting vent plugs and not through the liquid-air separating air exchange plug at the caging tool opening. Nevertheless, applicant has shown that even in these wet weather circumstances, the moisture is expelled from the spring brake actuator through the various vent plugs during use of the actuator on a moving vehicle through provision of gravitational, vibrational, and air-pressure forces.

One way in which moisture may enter a spring brake actuator comprising a liquid-air separating air exchange plug at the caging tool opening as well as multiple moisture-limiting and debris-limiting vent plugs is through undercarriage pressure washing of a vehicle. In this particular circumstance, moisture and corrosive detergents and other cleaners are introduced to the exterior of the brake actuator under significant pressure. Applicant has observed limited moisture entry into the actuator under these extreme circumstances. Nevertheless, expulsion of the moisture over time through usage has been observed through the air-exchange plugs provided in the housing resulting in extended life for the spring and pushrod of the actuator by actually expelling the corrosive cleaning materials and moisture through vehicle and brake usage.

EXAMPLES

Example 1

Water spray accumulation tests were conducted comparing two embodiments of an air exchange air-water separating device according to the disclosure herein affixed to the caging tool opening and four vent plug embodiments in a state-of-the-art non-sealed aftermarket air brake chamber (labeled CR) to five state-of-the-art non-sealed original equipment manufacturer (OEM) air brake chambers (labeled SA) where each chamber was positioned at 45° (FIG. 10) and 75° (FIG. 11) from horizontal. Brake chambers were exposed to spray water spraying initially at around 70 psi with a flow rate of 21.4 gallons per hour and accelerated to approximately 55 mph using a fan. Water accumulation was measured by weight at 2-hour intervals over 8 hours. Water weight by oz. was measured and graphed against time in FIGS. 10 and 11 for each tested brake chamber at each position.

The five different state-of-the art non-sealed brake chambers were mounted on brackets at 45° and 75° from horizontal to replicate possible real life axle configurations and possible worst-case scenarios as understood in the art. Brake chamber compressed air port holes were sealed to prevent water accumulation that the chamber would not normally see on installation. To maintain accumulated water within the chambers, each chamber was rotated so that the four vent holes on the sealed side were located as far from directly downward as possible. Water was sprayed at the brake chambers via a misting nozzle at a distance of 5 ft from the chamber at a 15° angle above the chambers. Water pressure at the nozzle was standard city water pressure (~70 psi) and the flow rate was 21.4 GPH. To ensure sufficient over-the-road speed, a fan was mounted 1 ft behind the spray nozzle (6 ft from the chamber), and at the same height of the spray nozzle, to accelerate the water to approximately 55 mph.

Water accumulation was observed by weighing the chambers before testing, with all appropriate equipment installed, and at 2-hour intervals over a duration of eight hours of spray testing. Prior to weighing, the exterior surfaces of each chamber were wiped dry to prevent surface water from obscuring results. The data are provided below in Tables 1 and 2 and also in FIGS. 10 and 11.

TABLE 1

45° Mounting Bracket

| | TEST 1 Water Accumulated (oz) | TEST 2 Water Accumulated (oz) | TEST 3 Water Accumulated (oz) | Average |
|---|---|---|---|---|
| Standard | 0 | 0 | 0 | 0.000 |
| Aftermarket Chamber with Standard Dust Plug and No Vent Plugs Test SA 1 | 4.65 | 0.15 | 0.1 | 1.633 |
| | 7.45 | 0.15 | 0.2 | 2.600 |
| | 9.8 | 0.3 | 0.65 | 3.583 |
| | 9.9 | 0.65 | 0.75 | 3.767 |
| Standard | 0 | 0 | 0 | 0.000 |
| Standard 24 in² OEM Chamber Test SA 2 | 0.85 | 0.9 | 0.35 | 0.700 |
| | 2.15 | 2.05 | 1.1 | 1.767 |
| | 2.3 | 2.3 | 1.45 | 2.017 |
| | 2.7 | 4.35 | 2 | 3.017 |
| Standard | 0 | 0 | 0 | 0.000 |
| Standard 30 in² OEM Chamber with elongated tab dust plug Test SA 3 | 0.1 | 0.15 | 0.1 | 0.117 |
| | 0.25 | 0.25 | 0.1 | 0.200 |
| | 0.35 | 0.2 | 0.1 | 0.217 |
| | 0.55 | 0.25 | 0.25 | 0.350 |
| Standard | 0 | 0 | 0 | 0.000 |
| Standard 30 in² OEM Chamber with strapped dust plug Test SA 4 | 0.65 | 0.55 | 1.15 | 0.783 |
| | 3.95 | 0.75 | 2.75 | 2.483 |
| | 4.65 | 0.95 | 4.95 | 3.517 |
| | 6.75 | 1.2 | 6.4 | 4.783 |
| Standard | 0 | 0 | 0 | 0.000 |
| Standard 30 in² OEM Chamber with small round dust plug Test SA 5 | 0.35 | 1 | 0.6 | 0.650 |
| | 0.5 | 1.25 | 0.75 | 0.833 |
| | 0.5 | 1.4 | 1 | 0.967 |
| | 0.55 | 1.45 | 1.05 | 1.017 |
| Standard | 0 | 0 | 0 | 0.000 |
| Aftermarket Chamber with CR Vent Plug With 2-way Slit and Vent Hole Plugs Test CR 1 | 0.1 | 0.15 | 0.15 | 0.133 |
| | 0.2 | 0.2 | 0.2 | 0.200 |
| | 0.25 | 0.2 | 0.2 | 0.217 |
| | 0.35 | 0.2 | 0.2 | 0.250 |
| Standard | 0 | 0 | 0 | 0.000 |
| Aftermarket Chamber with CR vent plug and Vent hole plugs Test CR 2 | 0.15 | 0.1 | 0.2 | 0.150 |
| | 0.2 | 0.1 | 0.2 | 0.167 |
| | 0.2 | 0.1 | 0.2 | 0.167 |
| | 0.25 | 0.1 | 0.15 | 0.167 |

TABLE 2

75° Mounting Bracket

| | TEST 1 Water Accumulated (oz) | TEST 2 Water Accumulated (oz) | TEST 3 Water Accumulated (oz) | Average |
|---|---|---|---|---|
| Standard | 0 | 0 | 0 | 0.000 |
| Aftermarket Chamber with Standard Dust Plug and No Vent Plugs Test SA 1 | 0.2 | 0.1 | 0.25 | 0.183 |
| | 0.4 | 0.2 | 0.45 | 0.350 |
| | 0.45 | 0.55 | 0.5 | 0.500 |
| | 0.5 | 0.9 | 0.6 | 0.667 |
| Standard | 0 | 0 | 0 | 0.000 |
| Standard 24 in² OEM Chamber Test SA 2 | 0.15 | 2.95 | 0.2 | 1.100 |
| | 0.25 | 3.95 | 0.35 | 1.517 |
| | 0.25 | 4.2 | 1.25 | 1.900 |
| | 0.35 | 5.35 | 1.75 | 2.483 |
| Standard | 0 | 0 | 0 | 0.000 |
| Standard 30 in² OEM Chamber with elongated tab | 0.55 | 0.05 | 1 | 0.533 |
| | 1.45 | 0.4 | 1.85 | 1.233 |
| | 1.85 | 0.4 | 2.5 | 1.583 |

TABLE 2-continued

75° Mounting Bracket

| | TEST 1 Water Accumulated (oz) | TEST 2 Water Accumulated (oz) | TEST 3 Water Accumulated (oz) | Average |
|---|---|---|---|---|
| dust plug Test SA 3 | 2.4 | 0.55 | 3.1 | 2.017 |
| Standard 30 in² OEM | 0 | 0 | 0 | 0.000 |
| Chamber with strapped dust plug Test SA 4 | 0.5 | 0.25 | 0.15 | 0.300 |
| | 1.35 | 1.4 | 0.15 | 0.967 |
| | 2.3 | 2.8 | 0.15 | 1.750 |
| | 2.85 | 3.7 | 0.2 | 2.250 |
| Standard 30 in² OEM | 0 | 0 | 0 | 0.000 |
| Chamber with small round dust plug Test SA 5 | 0.2 | 0.45 | 0.45 | 0.367 |
| | 4.45 | 0.45 | 0.45 | 1.783 |
| | 7.4 | 0.55 | 0.55 | 2.833 |
| | 11.65 | 0.6 | 0.75 | 4.333 |
| Standard Aftermarket Chamber with CR Vent Plug With 2-way Slit and Vent Hole Plugs Test CR 1 | 0 | 0 | 0 | 0.000 |
| | 0.05 | 0.1 | 0.05 | 0.067 |
| | 0.05 | 0.05 | 0.1 | 0.067 |
| | 0.1 | 0.1 | 0.1 | 0.100 |
| | 0.1 | 0.1 | 0.15 | 0.117 |
| Standard Aftermarket Chamber with CR vent plug and Vent hole plugs Test CR 2 | 0 | 0 | 0 | 0.000 |
| | 0.05 | 0.1 | 0.15 | 0.100 |
| | 0.05 | 0.1 | 0.15 | 0.100 |
| | 0.1 | 0.1 | 0.1 | 0.100 |
| | 0.15 | 0.1 | 0.05 | 0.100 |

The data demonstrate that installation of an embodiment of the air exchange air-water separating device plug vastly and surprisingly reduced water accumulation as compared to the standard aftermarket and original equipment manufacture (OEM) chambers.

Example 2

Safety blowout tests were undertaken on brake chambers subject to various levels of sealing and protection of the caging tool opening hole and the breather holes within the chamber. The purpose of the safety test was to determine how a brake chamber would perform if a liquid-air separating air exchange device plug embodiment is clogged internally and the parking brake is released (compressing power spring and reducing volume on the side of the chamber with an embodiment plug) as compared to other configurations. For each non-control test (Test 2-4), the main air passageway of the vent mechanism of the liquid-air separating air exchange device was blocked via a screw and sealed with cyanoacrylate adhesive. One functional safety goal for braking in the art is to achieve parking brake release with as little reduction in stroke length as possible. This test measured stroke length to determine how the brake chambers would perform under excessive positive pressure in an emergency circumstance.

In a first test (Test 1), a standard aftermarket air brake chamber having no restriction on air flow in or out of the chamber (with no plugs or sealing of the caging tool hole or the four breather holes) was employed as a control chamber. In this control test, stroke length at 120 pounds per square inch (PSI) was observed to be 2.6 inches. Stroke length at 80 PSI was observed to be 2.5 in. Stroke length at 60 PSI was observed to be 1.95 in.

In a second test (Test 2), the standard aftermarket air brake chamber with the caging tool hole plugged with a liquid-air separating air exchange plug embodiment and breather holes plugged with press-in vent plug embodiments was observed as a "plugged chamber" working embodiment. Stroke length at 120 PSI was observed to be 2.6 inches. Stroke length at 80 PSI was observed to be 2.5 in. Stroke length at 60 PSI was observed to be 1.9 in.

In a third test (Test 3), the standard aftermarket air brake chamber with the caging tool hole plugged with a liquid-air separating air exchange plug embodiment glued into the caging tool hole with cyanoacrylate adhesive and breather holes sealed with plugs likewise glued into the breather holes was tested as a "semi-sealed chamber" working embodiment. Stroke length at 120 PSI was observed to be 2.6 inches. Stroke length at 80 PSI was observed to be 2.5 in. Stroke length at 60 PSI was observed to be 1.9 in.

In a fourth test (Test 4), the standard aftermarket air brake chamber was entirely sealed with the caging tool hole plugged with liquid-air separating air exchange plug embodiment that was glued over to seal the breathing mechanism of the plug and breather holes fully sealed with plugs likewise glued over the breather holes. This fourth test was considered a test of a fully-sealed chamber. With the fully-sealed chamber, stroke length at 120 PSI was observed to be 2.6 inches. Stroke length at 80 PSI was observed to be 2.0 in. Stroke length at 60 PSI was observed to be 1.45 in.

It was observed that when the liquid-air separating air exchange plug embodiment was pressed into or glued into the caging tool hole, the chamber was still able to sufficiently expel built up pressure through the liquid-air separating air exchange plug embodiment. This observation was shown by nearly identical stroke lengths on the control chamber (test 1) as compared to plugged chamber (test 2) and the semi-sealed chamber (test 3). In contrast, the fully-sealed chamber (test 4) revealed significant reductions to the stroke length due to pressure buildup on the power spring side of the chamber combating the pressure of the brake actuator diaphragm.

These data demonstrate chambers with liquid-air separating air exchange plug embodiments do not engender pressure buildup on the power spring side of the chamber and do not restrict working pressure on the brake actuator diaphragm. As a result, chambers with liquid-air separating air exchange plug embodiments provide surprising restriction of water and contaminants from entering the housing (see Example 1 and FIGS. 10 and 11) while additionally surprisingly not detrimentally impacting the operation of the brake chamber.

Example 3

Parking side pressure exhaust tests were undertaken on a range of commercially available brake chambers and compared with brake chambers affixed with an embodiment of a liquid-air separating air exchange plug. The test demonstrated that the installation of the liquid-air separating air exchange plug embodiment surprisingly does not affect the operation of the parking brake actuation by any appreciable amount. The test measured the pressure on the pressurized side of the parking brake chamber while the pressure was released, therefore engaging the parking brake.

In setup, various brake chambers were mounted in a fixed position with a pneumatic line connected to the pressure side of the parking brake chamber. Four inches off of the brake chamber a pressure sensor was placed to take data points for time and pressure every 0.001 seconds. Six inches off of the brake chamber, a quick release (QR) valve was placed for the purpose of dropping the pressure inside the chamber as quickly as possible. One of skill understood this test to be more stringent than real world applications in braking because the distance between the chamber and the QR valve on the fixture is shorter than in real world braking systems. In the test, the quick release valve was engaged and the pressure was measured on various brake chamber configurations. The measurements were compared.

One standard aftermarket brake chamber was tested where the standard dust plug for this aftermarket brake chamber was not reinserted into the caging tool hole for the test. The data for this open brake chamber are illustrated with a long-dash with single-dot line in FIG. 12. The same standard aftermarket brake chamber with caging tool hole and all breathing holes sealed with duct tape was tested. The data for this sealed brake chamber are illustrated with a short-dash line in FIG. 12. One standard OEM brake chamber with one-way exhaust valve in the caging tool hole was tested. The data for this one-way brake chamber are illustrated with a light solid line in FIG. 12. One standard aftermarket brake chamber was tested with a contaminant-resistant caging tool hole plug air-liquid separating air exchange embodiment and an embodiment of four pressed-in vent hole plugs. The data for this contaminant-resistant brake chamber embodiment are illustrated with a dotted line. Each of the tests were undertaken in the same manner and environment.

The non-limiting examples and embodiments provided herein are for illustration purposes to one of skill in the art. The artisan understands the full scope of the disclosure provided herein is not limited to the specific examples and embodiments but understands that the herein provided examples and embodiments illustrate and enable numerous specific and generalized modifications that are available to the artisan in practicing the full scope of the disclosure.

What is claimed is:

1. A gas-liquid separating gas exchange device comprising (1) at least one vent mechanism comprising at least one through-hole that services gas exchange in and out of at least one housing, (2) at least one shelter of the vent mechanism distal from the housing that provides at least one sheltered area distal to the vent mechanism, (3) at least one area-enclosing annular abutment integrated with at least one base member, wherein said at least one area-enclosing annular abutment distally from the housing and distally from the at least one base member and annularly encloses at least the at least one shelter and a distal portion of the at least one vent mechanism, and (4) at least one fluid-exchange passageway within the at least one shelter of the vent mechanism allowing fluid exchange between the at least one sheltered area and the at least one abutment, wherein fluid exits the at least one sheltered area via movement through the at least one fluid-exchange passageway and exits the device by moving over the at least one annular abutment and wherein gas exchanges between the interior of the housing and the exterior of the housing through the at least one through-hole of the at least one vent mechanism and through the at least one fluid-exchange passageway.

2. The device of claim 1, wherein said at least one base member comprises at least one base-member through-opening integrated with the at least one vent mechanism to allow gas exchange between the interior of the housing and the exterior of the housing through the at least one through-hole of the at least one vent mechanism.

3. The device of claim 2, wherein the at least one base member further comprises at least one attachment mechanism for attachment of the device to at least one opening in said housing.

4. The device of claim 2, wherein the at least one vent mechanism comprises a plurality of breathing apertures distal to the housing and axial to the at least one vent through-hole allowing gas to exchange from the interior of the housing into the at least one sheltered area.

5. The device of claim 4, wherein the plurality of breathing apertures distal to the housing and axial to the at least one vent through-hole exit the vent mechanism immediately proximal to the shelter.

6. The device of claim 2, wherein the at least one shelter of the vent mechanism distal from the housing comprises axial sidewalls at least partially in contact or integrated with the base member and rising distally from the housing and comprises at least one distal cover in contact or integrated with the sidewalls and said at least one shelter is annular with sidewalls distally tapering conically to the distal cover wherein the distal cover is likewise annular.

7. The device of claim 1, wherein the at least one area-enclosing abutment is axial to the vent mechanism and encompasses at least the distal portion of the vent mechanism and the shelter of the vent mechanism and wherein the at least one area-enclosing abutment is annular and axial to the distal portion of the vent mechanism and rises distally from the housing.

8. The device of claim 2, wherein the at least one area-enclosing abutment comprises a juncture with the at least one shelter of the vent mechanism to provide a fluid-catchment junction between the at least one area-enclosing abutment and the at least one shelter.

9. The device of claim 8, wherein the at least one shelter of the vent mechanism distal from the housing comprises axial sidewalls at least partially in contact or integrated with the base member and rising distally from the housing and comprises at least a distal cover in contact or integrated with the sidewalls and the at least one area-enclosing abutment is annular and axial to the distal portion of the vent mechanism rising distally from the housing and wherein the fluid-catchment junction is provided at an integrated juncture among the at least one shelter, the at least one area-enclosing abutment, and the at least one base member.

10. The device of claim 9, wherein the at least one fluid-exchange passageway provides fluid exchange between the at least one sheltered area and at least one fluid-catchment junction and the at least one fluid-exchange passageway is at least four fluid exchange passageways.

11. The device of claim 10, wherein the at least one vent mechanism further comprises at least one flexible two-way venting valve.

12. The device of claim 11, wherein the at least one flexible two-way venting valve is a flexible slit two-way venting valve positioned within the at least one through-hole of the at least one vent mechanism distal to the housing.

13. The device of claim 10, wherein the device is oriented at an angle perpendicular to the force of gravity such that (1) liquid present in the fluid-catchment junction may migrate over the at least one abutment and out of the device as liquid rises within the fluid-catchment junction to a point at which it may overflow the distal portion of the at least one abutment, (2) liquid present in the fluid-catchment junction may be shaken over the abutment and out of the device as vibrational forces or air-pressure forces or a combination of both are applied to the device, or (3) liquid present in the fluid-catchment junction may proceed over the at least one abutment and out of the device through a combination of gravitational, vibrational, and air-pressure forces.

14. The device of claim 13, wherein the at least one vent mechanism comprises a plurality of breathing apertures distal to the housing and axial to the at least one vent through-hole allowing gas to exchange from the interior of the housing into the at least one sheltered area and wherein the device is oriented at a sufficient angle to the force of gravity in combination with any of said vibrational forces such that substantial liquid does not enter any one of the plurality of breathing apertures at the distal portion of the at least one vent mechanism and overflow through the at least one vent through-hole into the housing before exiting the device over the at least one abutment by the force of gravity in combination with any of said vibrational or air-pressure forces.

15. The device of claim 1, wherein said gas-liquid separating gas exchange device is an air-water separating air exchange device and the housing is an air brake actuator housing.

16. The device of claim 2, wherein the base member is constructed in an integral manner from a resilient elastomeric material and comprises a retention portion which can be assembled in a positive-locking manner with resilient deformation in an associated through-opening in the at least one housing and wherein the base member further comprises an extension arm extending outward from the retention portion of the base member wherein said extension arm comprises a resilient deformable annular and tubular stem further comprising an attachment mechanism for insertion in a corresponding stem attachment receiving hole in the housing.

17. A spring air brake actuator system for heavy duty vehicles, wherein the actuator system comprises external venting of the emergency brake housing, comprising: an actuator housing, a service diaphragm, a service pushrod, a service spring, a parking diaphragm, a parking push-rod, a parking spring, a caging tool opening, and a plug for the caging tool opening that separates air from water while allowing air to exchange between the interior and exterior of the actuator housing, wherein the plug comprises (1) at least one vent mechanism comprising at least one through-hole that services gas exchange for the actuator housing, (2) at least one shelter of the vent mechanism distal from the actuator housing that provides at least one sheltered area distal to the vent mechanism, (3) at least one area-enclosing annular abutment rising distally from the actuator housing and annularly enclosing at least the at least one shelter and at least a distal portion of the at least one vent mechanism, (4) at least one fluid-exchange passageway within the at least one shelter allowing fluid exchange between the at least one sheltered area and the at least one area-enclosing annular abutment, wherein fluid exits the at least one sheltered area via movement through the at least one fluid-exchange passageway and exits the device by moving over the at least one area-enclosing annular abutment and (5) at least one base member integrated with said at least one area-enclosing annular abutment, wherein said at least one area-enclosing annular abutment rises distally from said at least one base member, said at least one base member comprising at least one base-member through-opening integrated with the at least one vent mechanism to allow gas exchange between the interior of the housing and the exterior of the housing through the at least one through-hole of the vent mechanism and comprising at least one attachment mechanism for attachment of the device to at least one opening in the at least one housing.

18. The spring air brake actuator system for heavy duty vehicles of claim 17, wherein the at least one vent mechanism further comprises at least one flexible two-way venting valve and wherein the at least one flexible two-way venting valve is a flexible slit two-way venting valve positioned in the vent through-hole of the at least one vent mechanism distal to the housing.

19. An air-water separating air exchange device comprising:
(1) at least one vent mechanism that services air exchange in and out of at least one brake actuator housing, wherein the at least one vent mechanism comprises a plurality of breathing apertures distal to the housing and axial to at least one vent through-hole allowing gas to exchange from the interior of the housing into at least one sheltered area and wherein the breathing apertures exit the vent mechanism immediately proximal to a shelter covering,
(2) at least one shelter of the vent mechanism distal from the housing that provides at least one sheltered area distal to the vent mechanism, wherein the at least one shelter of the vent mechanism distal from the housing comprises axial sidewalls at least partially in contact or integrated with at least one base member and rising distally from the housing and comprises at least a distal cover in contact or integrated with the sidewalls and said at least one shelter is annular with sidewalls distally tapering in a conical and narrowing direction to the distal cover where the distal cover is likewise annular and provides said shelter covering of said vent mechanism,
(3) at least one area-enclosing abutment rising distally from the housing enclosing at least the at least one shelter and a distal portion of the at least one vent mechanism, wherein the at least one area-enclosing abutment is axial to the vent mechanism and encompasses at least the distal portion of the vent mechanism and the shelter of the vent mechanism and wherein the at least one area-enclosing abutment is annular and axial to the distal portion of the vent mechanism rising distally from the housing and wherein the at least one area-enclosing abutment comprises a juncture with the at least one shelter of the vent mechanism to provide a fluid-catchment junction between the at least one area-enclosing abutment and the at least one shelter and wherein the fluid-catchment junction is provided at an integrated juncture among the at least one shelter, the at least one area-enclosing abutment, and the at least one base member,
(4) a plurality of fluid-exchange passageways within the at least one shelter of the vent mechanism allowing fluid exchange between the at least one sheltered area and the at least one abutment, wherein fluid exits the at least one sheltered area via movement through one or more of the plurality of fluid-exchange passageways and exits the device by moving over the at least one abutment and air exchanges between the interior of the housing and the exterior of the housing through the at least one vent mechanism and through the plurality of fluid-exchange passageways and wherein one or more of the plurality of fluid-exchange passageways provides fluid exchange between the at least one sheltered area and at least one fluid-catchment junction, and
(5) said at least one base member comprising at least one base-member through-opening integrated with the at least one vent mechanism to allow air exchange between the interior of the housing and the exterior of the housing through the at least one through-hole of the at least one vent mechanism wherein the at least one base member comprises at least one attachment mechanism for attachment of the device to at least one associated through-opening in said housing wherein the base member is constructed in an integral manner from a resilient elastomeric material and comprises a retention portion which can be assembled in a positive-locking manner with resilient deformation to the associated through-opening in the at least one housing and further comprises an extension arm extending outward from the retention portion of the base member and comprising a resilient deformable annular and tubular stem further comprising an attachment mechanism for insertion in a corresponding stem attachment receiving hole in the housing.

20. The air-water separating air exchange device of claim 19 wherein, the at least one vent mechanism further comprises at least one flexible two-way venting valve and wherein the at least one flexible two-way venting valve is a flexible slit two-way venting valve positioned within the through-hole of the at least one vent mechanism distal to the housing.

\* \* \* \* \*